US012713374B2

(12) United States Patent
Hirzallah et al.

(10) Patent No.: US 12,713,374 B2
(45) Date of Patent: Aug. 18, 2026

(54) SIGNALING OF ASSISTANCE INFORMATION FOR SENSING ENTITIES

(71) Applicant: QUALCOMM Incorporated, San Diego, CA (US)

(72) Inventors: Mohammed Ali Mohammed Hirzallah, San Diego, CA (US); Marwen Zorgui, San Diego, CA (US); Srinivas Yerramalli, San Diego, CA (US)

(73) Assignee: QUALCOMM Incorportated, San Diego, CA (US)

( * ) Notice: Subject to any disclaimer, the term of this patent is extended or adjusted under 35 U.S.C. 154(b) by 486 days.

(21) Appl. No.: 18/345,818

(22) Filed: Jun. 30, 2023

(65) Prior Publication Data

US 2025/0008461 A1 Jan. 2, 2025

(51) Int. Cl.
*H04W 56/00* (2009.01)
*H04W 64/00* (2009.01)

(52) U.S. Cl.
CPC ..... *H04W 56/0025* (2013.01); *H04W 64/003* (2013.01)

(58) Field of Classification Search
CPC ............ H04W 56/0025; H04W 64/003; G01S 2013/462; G01S 7/0236; G01S 13/46; G01S 7/006
See application file for complete search history.

(56) References Cited

U.S. PATENT DOCUMENTS 9,819,901 B1 * 11/2017 Zhu ....................... H04W 52/46
2013/0308715 A1 * 11/2013 Nam .................... H04B 7/0639 375/267
2021/0028832 A1 * 1/2021 Liu ...................... H04B 7/0617
2022/0155435 A1 * 5/2022 Bayesteh ................ G01S 13/88
2022/0256519 A1 8/2022 Jeon et al.
2022/0377792 A1 * 11/2022 Murakami ............ G01S 13/003
2023/0132850 A1 * 5/2023 Liu ....................... G01S 13/003 342/58

(Continued)

FOREIGN PATENT DOCUMENTS

WO 2022232350 A1 11/2022
WO 2023077010 A1 5/2023

OTHER PUBLICATIONS

International Search Report and Written Opinion—PCT/US2024/034268—ISA/EPO—Sep. 19, 2024.

*Primary Examiner* — Christine Ng

(74) *Attorney, Agent, or Firm* — Procopio, Cory, Hargreaves & Savitch LLP

(57) ABSTRACT

A first sensing entity may receive, from a second sensing entity, a sensing information message that may include a first set of sensing attributes associated with a set of objects within an area associated with the first sensing entity. The first sensing entity may transmit a set of sensing signals at a target object. The first sensing entity may receive a set of reflected sensing signals based on the set of sensing signals and the target object. The first sensing entity may measure a second set of sensing attributes associated with the target object based on the set of reflected sensing signals and the first set of sensing attributes. The measured second set of sensing attributes may be more accurate than a set of sensing attributes that are not based on the first set of sensing attributes.

31 Claims, 19 Drawing Sheets

(56) References Cited

U.S. PATENT DOCUMENTS

2023/0135716 A1* 5/2023 Ibrahim .................... H04L 5/14
370/329
2024/0049161 A1* 2/2024 Katla .................... G01S 13/003
2025/0004090 A1* 1/2025 Hasegawa ............ H04B 17/364
2025/0093487 A1* 3/2025 Walker .................. G01S 13/003
2025/0126507 A1* 4/2025 Gao ..................... H04B 7/0626
2025/0330786 A1* 10/2025 Li ......................... H04W 36/30
2025/0374235 A1* 12/2025 Taghizadeh Motlagh ..................
G01S 13/46

* cited by examiner

200
One Frame (TDD)
10 ms
subframe
RB
slot
D D D D D D D D D D D D F U
subcarrier
OFDM symbol
slot
DMRS R
CSI-RS 230
PDCCH CORESET
SSS
PSS
PDSCH
PBCH
REG 12 REs
1 CCE = 6 REGs
SS/PBCH Block
BWP
BWP
20 RBs
channel bandwidth RBs 250
One Frame (TDD)
10 ms
subframe
RB
slot
U U U U U U U U U U U U U U
subcarrier
OFDM symbol
slot
SRS
SRS Comb 0
SRS Comb 1
DMRS R

280
PUCCH
PUSCH

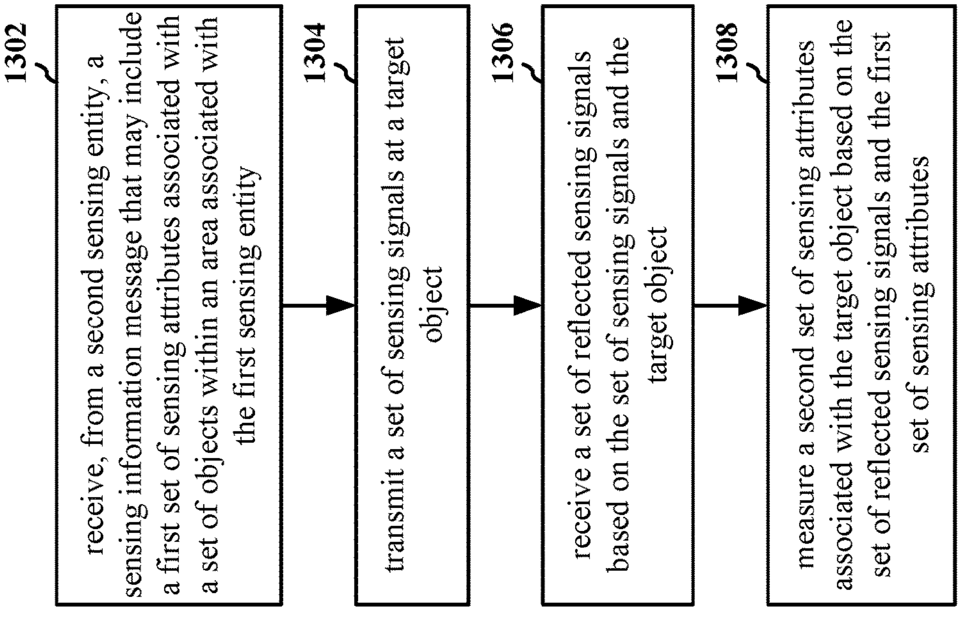
FIG. 13
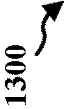

SIGNALING OF ASSISTANCE INFORMATION FOR SENSING ENTITIES

TECHNICAL FIELD

The present disclosure relates generally to communication systems, and more particularly, to a wireless sensing system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new conditions associated with latency, reliability, security, scalability (e.g., with Internet of Things (IoT)), and other conditions. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Further improvements in 5G NR technology may be beneficial. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a first sensing entity. The first sensing entity may include a user equipment (UE), a network node, a transmission reception point (TRP), a sensing management control function (SMF), or a roadside unit (RSU). The apparatus may receive, from a second sensing entity, a sensing information message that may include a first set of sensing attributes associated with a set of objects within an area associated with the apparatus. The apparatus may be within the area. The apparatus may transmit a set of sensing signals at a target object. The apparatus may receive a set of reflected sensing signals based on the set of sensing signals and the target object. The apparatus may measure a second set of sensing attributes associated with the target object based on the set of reflected sensing signals and the first set of sensing attributes.

In an aspect of the disclosure, a method, a computer-readable medium, and an apparatus are provided. The apparatus may include a second sensing entity. The second sensing entity may include a UE, a network node, a TRP, an SMF, or an RSU. The apparatus may transmit a set of sensing signals at a set of target objects. The apparatus may receive a set of reflected sensing signals based on the set of sensing signals and the set of target objects. The apparatus may measure a set of sensing attributes associated with the set of target objects based on the set of reflected sensing signals. The apparatus may transmit a sensing information message that may include a first subset of the set of sensing attributes associated with a second subset of the set of target objects within an area associated with a first sensing entity.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 13 is a flowchart of a method of wireless communication.

DETAILED DESCRIPTION

Figure 1:
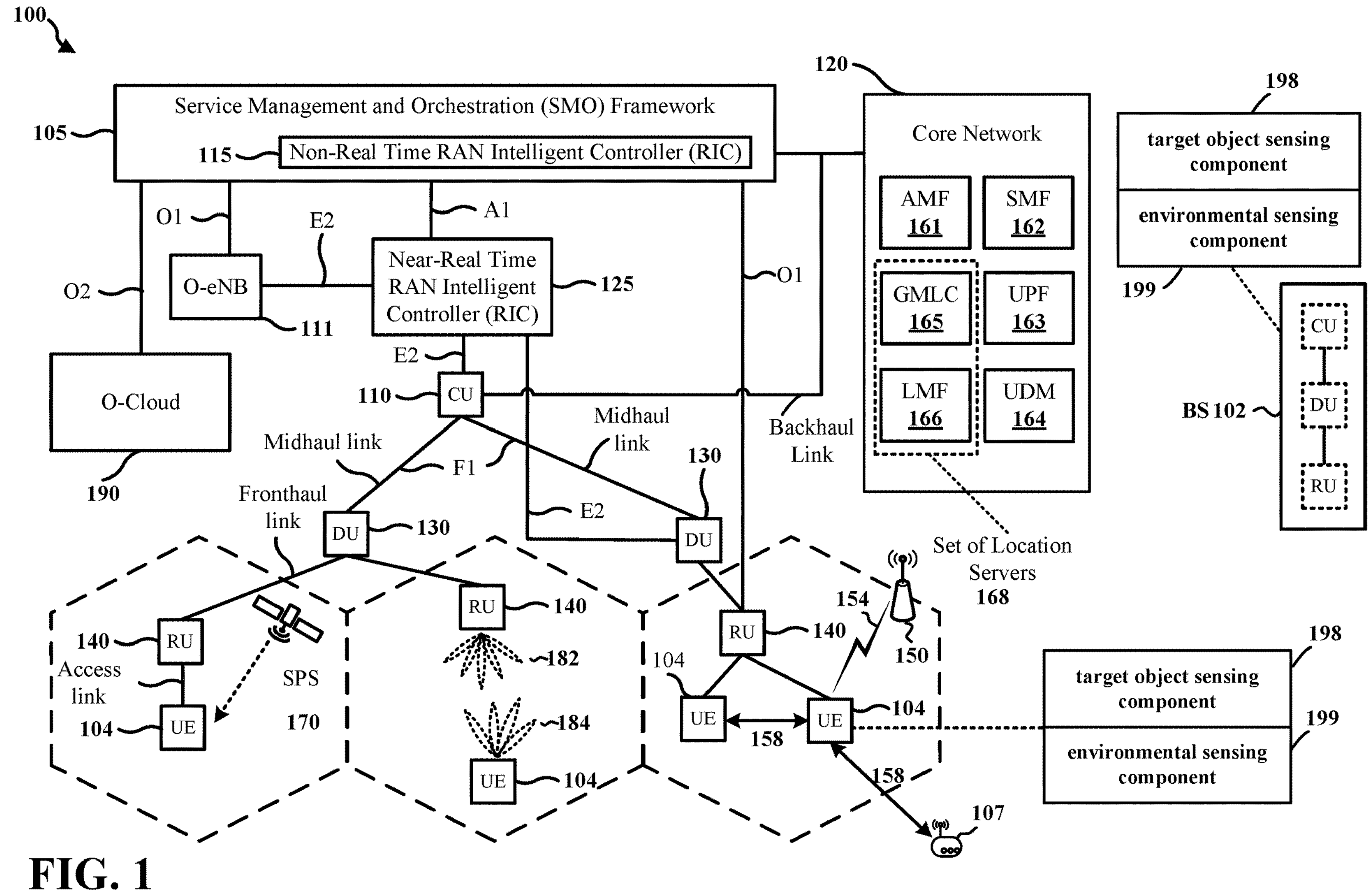
FIG. 1 is a diagram illustrating an example of a wireless communications system and an access network.

The following description is directed to examples for the purposes of describing innovative aspects of this disclosure. However, a person having ordinary skill in the art may recognize that the teachings herein may be applied in a multitude of ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described examples may be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also may be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IoT) network.

Various aspects relate generally to sensing objects within an area. Some aspects more specifically relate to sensing objects using RF signals. In some examples, a first sensing entity may receive, from a second sensing entity, a sensing information message that may include a first set of sensing attributes associated with a set of objects within an area associated with the first sensing entity. The first sensing entity may transmit a set of sensing signals at a target object. The first sensing entity may receive a set of reflected sensing signals based on the set of sensing signals and the target object. The first sensing entity may measure a second set of sensing attributes associated with the target object based on the set of reflected sensing signals and the first set of sensing attributes.

In some examples, a second sensing entity may transmit a set of sensing signals at a set of target objects. The second sensing entity may receive a set of reflected sensing signals based on the set of sensing signals and the set of target objects. The second sensing entity may measure a set of sensing attributes associated with the set of target objects based on the set of reflected sensing signals. The second sensing entity may transmit a sensing information message that may include a first subset of the set of sensing attributes associated with a second subset of the set of target objects within an area associated with a first sensing entity.

In RF sensing, background objects in the environment may be distinguished from a target object in order to properly sense the attributes of the target object. In some aspects, signaling from a second sensing entity that has already acquired background data on background objects in an environment may be transmitted to a first sensing entity. The first sensing entity may not have such information on background objects in the environment. Leveraging such signaling minimizes the resources that the first sensing entity uses to benchmark background objects in an environment before sensing a target object. In one aspect, a first sensing entity may request and/or receive background information of an indoor location from a second sensing entity as positioning assistance data. The positioning assistance data may be in the form of a positioning system information block (POS-SIB), a sensing system information block (sensing-SIB), or a dedicated message for such positioning assistance data. The background information may include a list of object locations and/or may include a stochastic/statistical description of objects in an environment. In one aspect, stochastic background information may be requested/provided based on operating frequency and sensing beam angle at a requested granularity. Such stochastic background information may be indicated as a probability distribution or a mean/kth percentile value. In one aspect, different sensing entities (e.g., UEs) may exchange background information via sidelink communication or Wi-Fi or ultra-wideband (UWB).

Particular aspects of the subject matter described in this disclosure can be implemented to realize one or more of the following potential advantages. In some examples, by exchanging a set of sensing attributes associated with a set of objects within an area between a second sensing entity with the set of sensing attributes and a first sensing entity without the set of sensing attributes, the described techniques may be used to reduce the amount of resources that the first sensing entity uses to analyze an environment for sensing a target object within the area. For example, if an RF sensor is configured to track humans or an automated guided vehicle (AGV) in a factory, the RF sensor may use the received set of sensing attributes to distinguish target objects from the background/environment RF signature/characteristics. Having knowledge of the background/environment RF signature/characteristics may help a sensing entity to perform successful detection and tracking of targets. In one example, a target object may be moving within an area, or moving at a different velocity to other background objects within the area. Detecting the moving target object may be easier with respect to objects that are not moving, allowing the sensing entity to detect and separate the moving target object from background objects. In another example, a target object may be stationary within an area, or may be moving at the same, or a similar, velocity to other background objects within the area. Background reporting may help a sensing entity sensing the target object to separate the object of interest from static background/environment reflections.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, may be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage conditions that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 6. Although the following description, including the example slot structure of FIG. 6, may provide examples for sidelink communication in connection with 5G NR, the concepts described herein may be applicable to other similar areas, such as LTE, LTE-A, CDMA, GSM, and other wireless technologies.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHZ). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHZ-71 GHZ), FR4 (71 GHz-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, a first sensing entity, such as the UE 104 or the base station 102, may have a target object sensing component 198 that may be configured to receive, from a second sensing entity, such as one with an environmental sensing component 199, a sensing information message that may include a first set of sensing attributes associated with a set of objects within an area associated with the first sensing entity. The target object sensing component 198 may be configured to transmit a set of sensing signals at a target object. The target object sensing component 198 may be configured to receive a set of reflected sensing signals based on the set of sensing signals and the target object. The target object sensing component 198 may be configured to measure a second set of sensing attributes associated with the target object based on the set of reflected sensing signals and the first set of sensing attributes. In certain aspects, a second sensing entity, such as the UE 104 or the base station 102, may have an environmental sensing component 199 that may be configured to transmit a set of sensing signals at a set of target objects. The environmental sensing component 199 may be configured to receive a set of reflected sensing signals based on the set of sensing signals and the set of target objects. The environmental sensing component 199 may be configured to measure a set of sensing attributes associated with the set of target objects based on the set of reflected sensing signals. The environmental sensing component 199 may be configured to transmit a sensing information message that may include a first subset of the set of sensing attributes associated with a second subset of the set of target objects within an area associated with a first sensing entity, such as an entity with the target object sensing component 198. In other words, the environmental sensing component 199 may perform sensing on an area to collect a set of sensing attributes associated with objects in the area. The environmental sensing component 199 may transmit the set of sensing attributes to the target object sensing component 198. The target object sensing component 198 may then perform sensing on a target object in that same area, with a better understanding of the environmental signature/characteristics of background objects in the area.

Figures 2A, 2B, 2C, 2D:
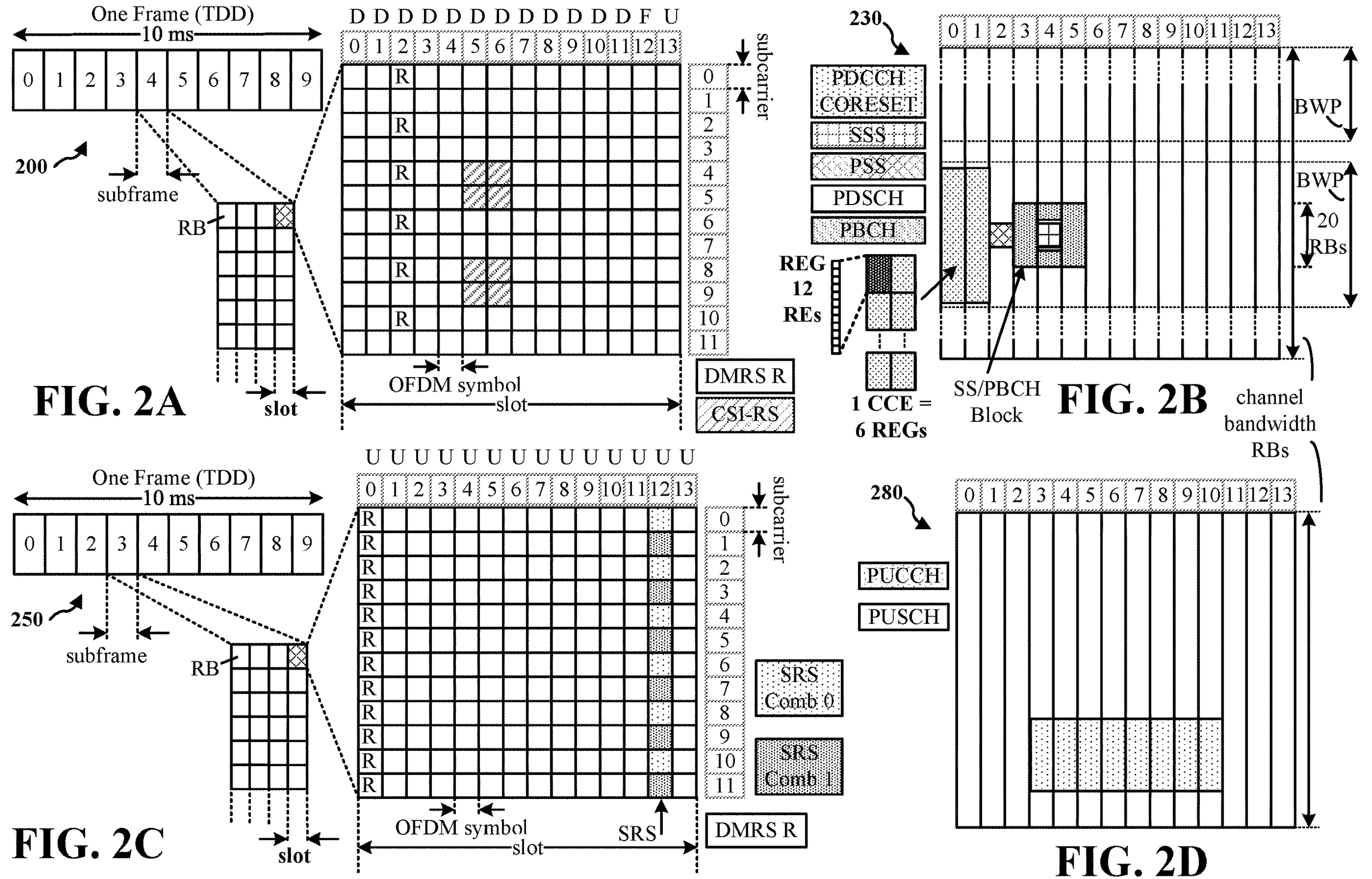
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology u, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
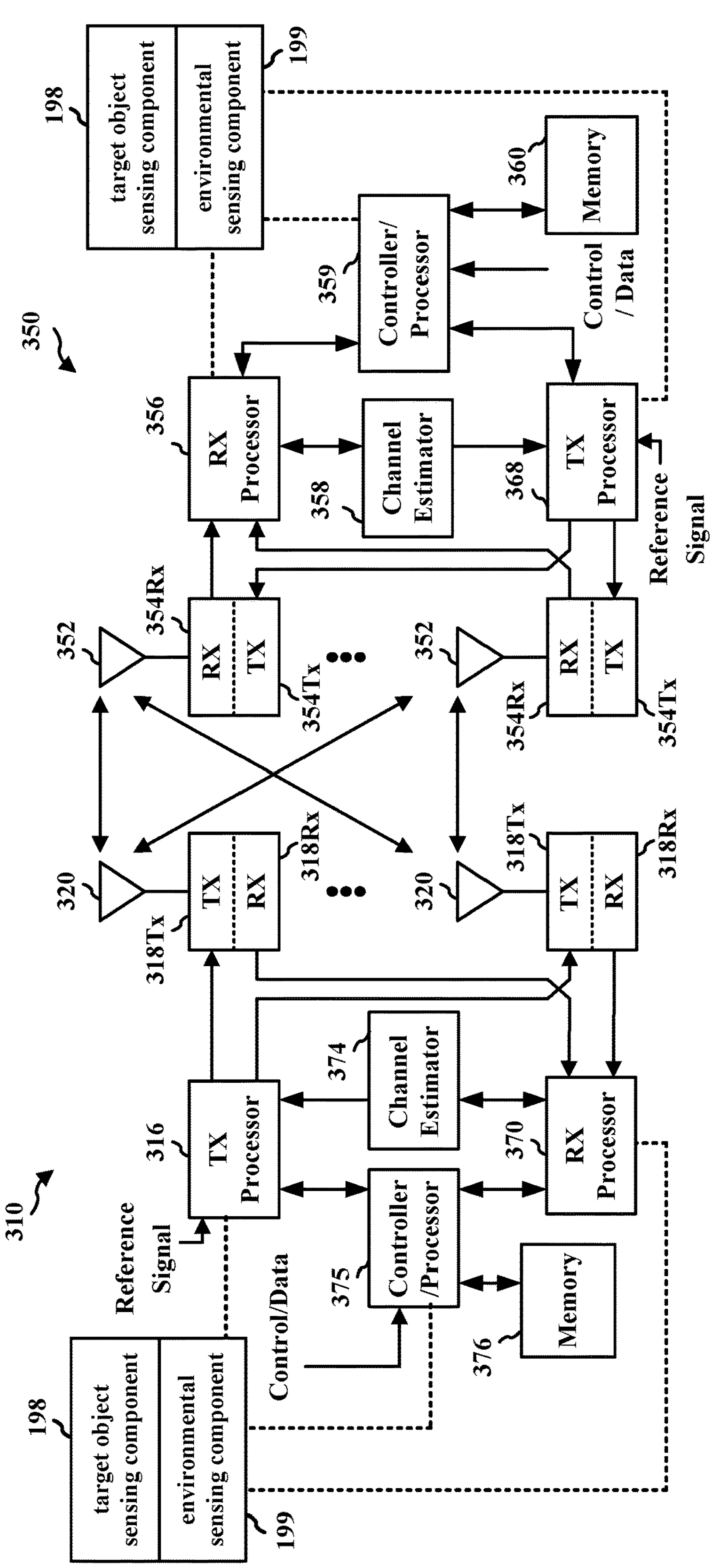
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/ processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the target object sensing component 198 of FIG. 1.

At least one of the TX processor 368, the RX processor 356, and the controller/processor 359 may be configured to perform aspects in connection with the environmental sensing component 199 of FIG. 1.

At least one of the TX processor 316, the RX processor 370, and the controller/processor 375 may be configured to perform aspects in connection with the target object sensing component 198 of FIG. 1.

At least one of the TX processor 316, the RX processor 370, and the controller/processor 375 may be configured to perform aspects in connection with the environmental sensing component 199 of FIG. 1.

Figure 4:
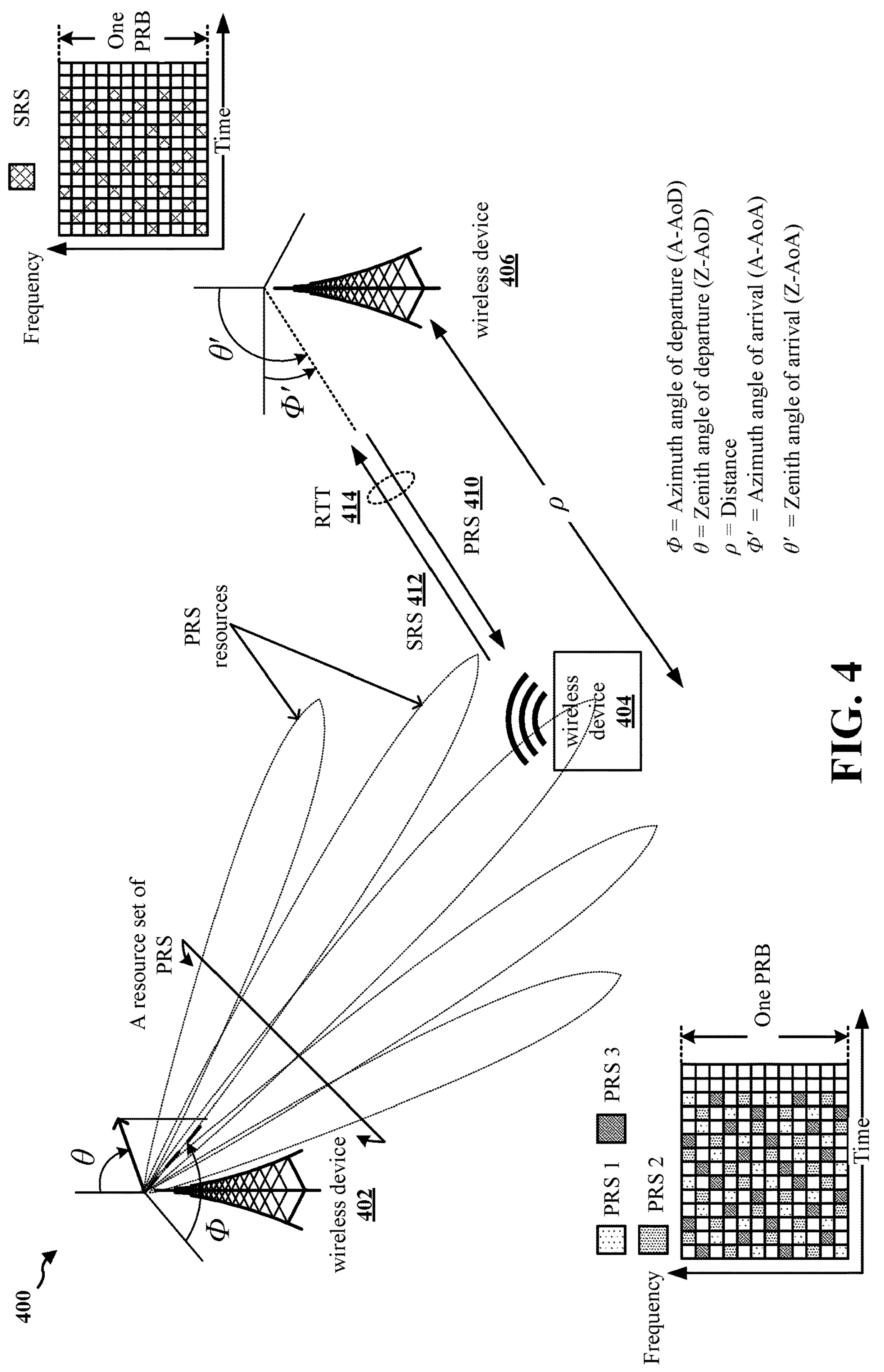
FIG. 4 is a diagram illustrating an example of a UE positioning based on reference signal measurements.

FIG. 4 is a diagram 400 illustrating an example of positioning of wireless devices based on reference signal measurements. The wireless device 402 may be a UE. The UE may be a positioning reference unit (PRU). A PRU may be a UE with a known location used for calibration purposes. The wireless device 402 may be a base station or a TRP. The wireless device 406 may be a base station or a TRP. The wireless device 404 may transmit UL-SRS 412 at time $T_{SRS\_TX}$ and receive DL positioning reference signals (PRS) (DL-PRS) 410 at time $T_{PRS\_RX}$. The wireless device 406 may receive the UL-SRS 412 at time $T_{SRS\_RX}$ and transmit the DL-PRS 410 at time $T_{PRS\_TX}$. The wireless device 404 may receive the DL-PRS 410 before transmitting the UL-SRS 412, or may transmit the UL-SRS 412 before receiving the DL-PRS 410. In both cases, a positioning server (e.g., location server(s) 168) or the wireless device 404 may determine the RTT 414 based on $||T_{SRS\_RX}-T_{PRS\_TX}|-|T_{SRS\_TX}-T_{PRS\_RX}||$. Accordingly, multi-RTT positioning may make use of the UE Rx−Tx time difference measurements (i.e., $|T_{SRS\_TX}-T_{PRS\_RX}|$) and DL-PRS reference signal received power (RSRP) (DL-PRS-RSRP) of downlink signals received from multiple wireless devices 402, 406 and measured by the wireless device 404, and the measured TRP Rx−Tx time difference measurements (i.e., $|T_{SRS\_RX}-T_{PRS\_TX}|$) and UL-SRS-RSRP at multiple wireless devices 402, 406 of uplink signals transmitted from wireless device 404. The wireless device 404 measures the UE Rx-Tx time difference measurements (and optionally DL-PRS-RSRP of the received signals) using assistance data received from the positioning server, and the wireless devices 402, 406 measure the gNB Rx−Tx time difference measurements (and optionally UL-SRS-RSRP of the received signals) using assistance data received from the positioning server. The measurements may be used at the positioning server or the wireless device 404 to determine the RTT, which is used to estimate the location of the wireless device 404. Other methods are possible for determining the RTT, such as for example using DL-TDOA and/or UL-TDOA measurements.

DL-AoD positioning may make use of the measured DL-PRS-RSRP of downlink signals received from multiple wireless devices 402, 406 at the wireless device 404. The wireless device 404 measures the DL-PRS-RSRP of the received signals using assistance data received from the positioning server, and the resulting measurements are used along with the azimuth angle of departure (A-AoD), the zenith angle of departure (Z-AoD), and other configuration information to locate the wireless device 404 in relation to the neighboring wireless devices 402, 406.

DL-TDOA positioning may make use of the DL reference signal time difference (RSTD) (and optionally DL-PRS-RSRP) of downlink signals received from multiple wireless devices 402, 406 at the wireless device 404. The wireless device 404 measures the DL RSTD (and optionally DL-PRS-RSRP) of the received signals using assistance data received from the positioning server, and the resulting measurements are used along with other configuration information to locate the wireless device 404 in relation to the neighboring wireless devices 402, 406.

UL-TDOA positioning may make use of the UL relative time of arrival (RTOA) (and optionally UL-SRS-RSRP) at multiple wireless devices 402, 406 of uplink signals transmitted from wireless device 404. The wireless devices 402, 406 measure the UL-RTOA (and optionally UL-SRS-RSRP) of the received signals using assistance data received from the positioning server, and the resulting measurements are used along with other configuration information to estimate the location of the wireless device 404.

UL-AoA positioning may make use of the measured azimuth angle of arrival (A-AoA) and zenith angle of arrival (Z-AoA) at multiple wireless devices 402, 406 of uplink signals transmitted from the wireless device 404. The wireless devices 402, 406 measure the A-AoA and the Z-AoA of the received signals using assistance data received from the positioning server, and the resulting measurements are used along with other configuration information to estimate the location of the wireless device 404.

Additional positioning methods may be used for estimating the location of the wireless device 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

Figure 5:
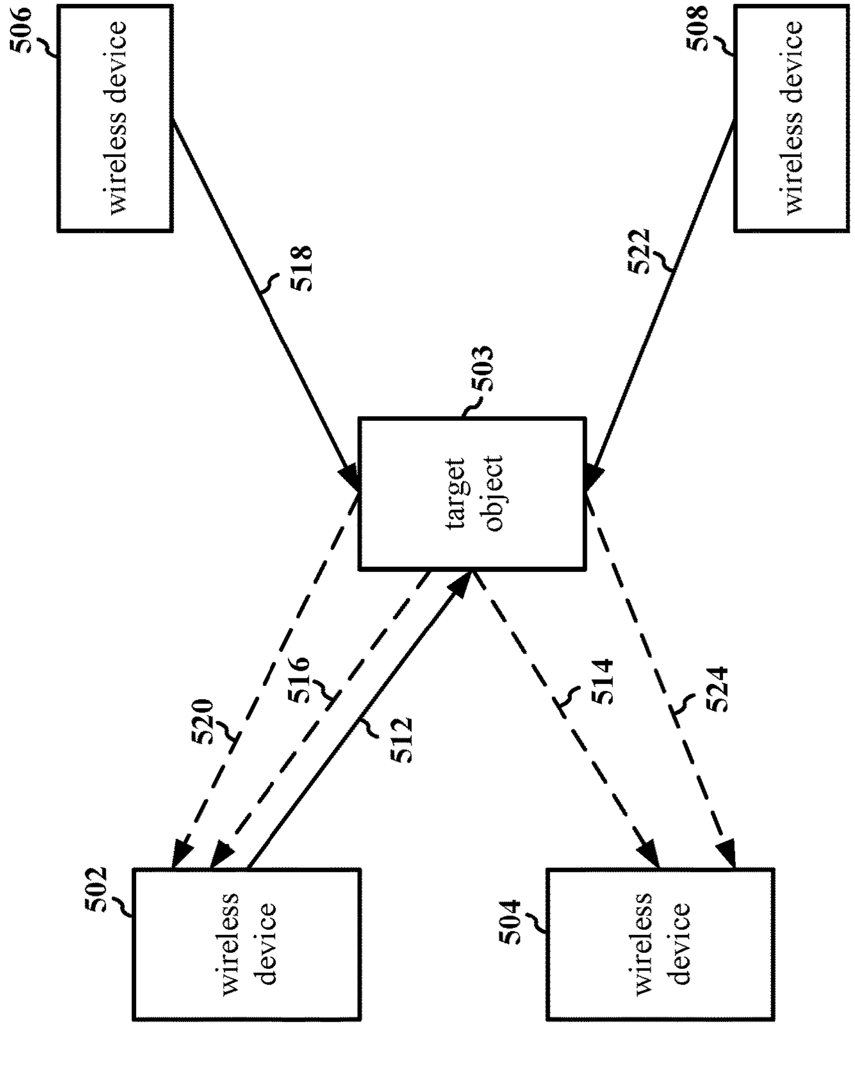
FIG. 5 is a diagram illustrating an example of sensing based on measurements of reflections of sensing signals.

FIG. 5 is a diagram 500 illustrating an example of sensing based on measuring sensing signals transmitted by one or more sensing signals that reflect off of a target object 503. A wireless device that transmits a sensing signal that reflects off of a target object may be referred to as a transmitter node. A wireless device that receives a reflected sensing signal and measures the reflected sensing signal to perform sensing may be referred to as a receiver node. In one aspect, the wireless device 502 may perform monostatic sensing. The wireless device 502 may act as both a transmitter node and a receiver node. The wireless device 502 may transmit a set of sensing signals 512 at the target object 503, the target object 503 may reflect the set of sensing signals 512 as the reflected set of sensing signals 516 at the wireless device 502, and the wireless device 502 may measure the reflected set of sensing signals 516 from the target object 503. In another aspect, the wireless device 502 and the wireless device 504 may perform bistatic sensing. The wireless device 502 may act as a transmitter node and the wireless device 504 acts as a receiver node. The wireless device 502 may transmit a set of sensing signals 512 at the target object 503, the target object 503 may reflect the set of sensing signals 512 as the reflected set of sensing signals 514 at the wireless device 504, and the wireless device 504 may measure the reflected set of sensing signals 514 from the target object 503. In another aspect the wireless device 502 and the wireless device 506 may perform multi-static sensing. The wireless device 502 may act as both a transmitter node and a receiver node, for a first set of sensing signals, and the wireless device 506 acts as a transmitter node while the wireless device 502 acts as a receiver node for a second set of sensing signals. In addition to the wireless device 502 measuring the reflected set of sensing signals 516 from the target object 503 using monostatic sensing, the wireless device 506 may transmit a set of sensing signals 518 at the target object 503, the target object 503 may reflect the set of sensing signals 518 as the reflected set of sensing signals 520 at the wireless device 502, and the wireless device 502 may measure the reflected set of sensing signals 520 from the target object 503. In another aspect the wireless device 502, the wireless device 504, and the wireless device 508 may perform multi-static sensing. The wireless device 502 may act as a transmitter node and the wireless device 504 acts as a receiver node for a first set of sensing signals, and the wireless device 508 acts as a transmitter node and the wireless device 504 acts as a receiver node for a second set of sensing signals. In addition to the wireless device 504 measuring the reflected set of sensing signals 514 from the target object 503 using bistatic sensing, the wireless device 508 may transmit a set of sensing signals 522 at the target object 503, the target object 503 may reflect the set of sensing signals 522 as the reflected set of sensing signals 524 at the wireless device 504, and the wireless device 504 may measure the reflected set of sensing signals 524 from the target object 503. Each wireless device may be any wireless device configured to transmit or receive wireless signals, such as UEs, network nodes, TRPs, or base stations. For example, the wireless device 502 may be a network node configured to transmit the set of sensing signals 512 at the target object 503 and measure the reflected set of sensing signals 516 from the target object 503. In another example, the wireless device 502 may be a network node configured to transmit the set of sensing signals 512 at the target object 503, and the wireless device 504 may be a UE configured to measure the reflected set of sensing signals 514 from the target object 503.

The wireless device 502 may conduct one or more sensing measurements on the reflected set of sensing signals 516 and/or the reflected set of sensing signals 520. In one aspect, the wireless device 502 may calculate a distance or a range between the wireless device 502 and the target object 503 based on a round trip time (RTT) between when the wireless device 502 transmits the set of sensing signals 512 and when the wireless device 502 receives the reflected set of sensing signals 516. In one aspect, the wireless device 502 may calculate a distance or a range that the set of sensing signals 518 and the reflected set of sensing signals 520 travels based on a time between when the wireless device 506 transmits the set of sensing signals 518 and when the wireless device 502 receives the reflected set of sensing signals 520. In one aspect, the wireless device 502 may calculate a location of the target object 503 based on a plurality or range or distance measurements, for example via triangulation using known positions of the wireless devices 502 and 506 and the calculated range or distance measurements. In one aspect, the wireless device 502 may calculate a velocity of the target object 503 based on a first calculated location of the target object 503 based on the reflected set of sensing signals 516 and/or the reflected set of sensing signals 520 measured at a first time, and a second calculated location of the target object 503 based on the reflected set of sensing signals 516 and/or the reflected set of sensing signals 520 measured at a second time. In one aspect, the wireless device 502 may calculate an AoA of the reflected set of sensing signals 516 and/or an AoD of the set of sensing signals 512 based on a plurality of ports that transmitted the set of sensing signals 512 and a plurality of ports that received the reflected set of sensing signals 516. In one aspect, the wireless device 502 may calculate an AoA of the reflected set of sensing signals 520 and/or an AoD of the set of sensing signals 518 based on a plurality of ports that transmitted the set of sensing signals 518 and a plurality of ports that received the reflected set of sensing signals 520.

Similarly, the wireless device 504 may conduct one or more sensing measurements on the reflected set of sensing signals 514 and/or the reflected set of sensing signals 524. In one aspect, the wireless device 504 may calculate a distance or a range that the set of sensing signals 512 and the reflected set of sensing signals 514 travels based on a time between when the wireless device 502 transmits the set of sensing signals 512 and when the wireless device 504 receives the reflected set of sensing signals 514. In one aspect, the wireless device 504 may calculate a distance or a range that the set of sensing signals 522 and the reflected set of sensing signals 524 travels based on a time between when the wireless device 508 transmits the set of sensing signals 522 and when the wireless device 504 receives the reflected set of sensing signals 524. In one aspect, the wireless device 504 may calculate a location of the target object 503 based on a plurality or range or distance measurements, for example via triangulation using the known positions of wireless devices 502, 504, and 508, and the calculated range or distance measurements. In one aspect, the wireless device 504 may calculate a velocity of the target object 503 based on a first calculated location of the target object 503 based on the reflected set of sensing signals 514 and/or the reflected set of sensing signals 524 measured at a first time, and a second calculated location of the target object 503 based on the reflected set of sensing signals 514 and/or the reflected set of sensing signals 524 measured at a second time. In one aspect, the wireless device 504 may calculate an AoA of the reflected set of sensing signals 514 and/or an AoD of the set of sensing signals 512 based on a plurality of ports that transmitted the set of sensing signals 512 and a plurality of ports that received the reflected set of sensing signals 514. In one aspect, the wireless device 504 may calculate an AoA of the reflected set of sensing signals 524 and/or an AoD of the set of sensing signals 522 based on a plurality of ports that transmitted the set of sensing signals 522 and a plurality of ports that received the reflected set of sensing signals 524.

While a wireless device may sense parameters of the target object 503 by measuring a reflected set of sensing signals originating from a transmitter node, such a wireless device may improve its sensing by measuring two or more reflected sets of sensing signals originating from two or more transmitter nodes. For example, the wireless device 502 may improve its sensing by measuring the reflected set of sensing signals 516 originating from the wireless device 502 as the set of sensing signals 512 in addition to measuring the reflected set of sensing signals 520 originating from the wireless device 506 as the set of sensing signals 518. In another example, the wireless device 504 may improve its sensing by measuring the reflected set of sensing signals 514 originating from the wireless device 502 as the set of sensing signals 512 in addition to measuring the reflected set of sensing signals 524 originating from the wireless device 508 as the set of sensing signals 522.

Figure 6:
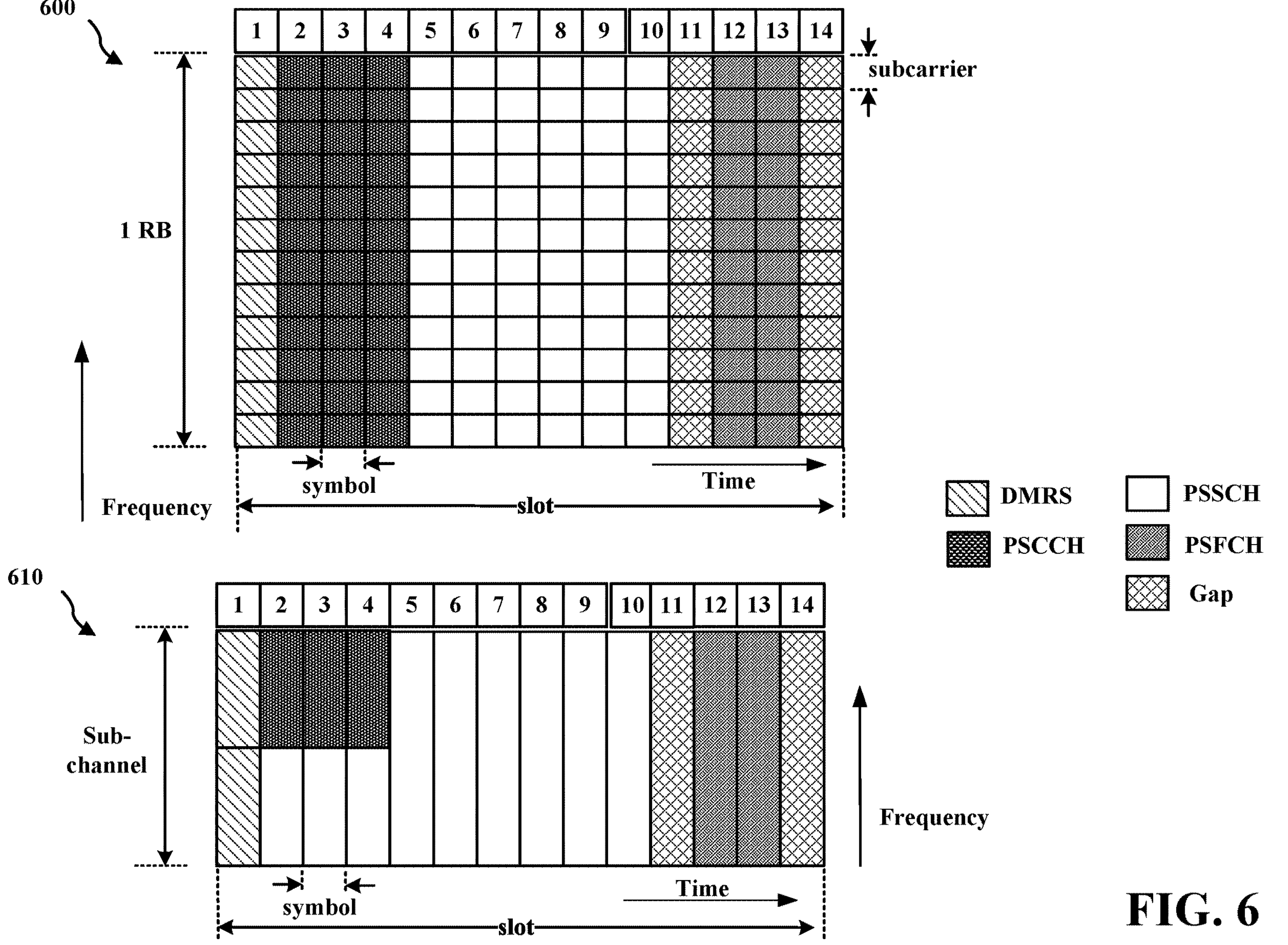
FIG. 6 illustrates example aspects of a sidelink slot structure.

FIG. 6 includes diagrams 600 and 610 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 6 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 600 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may include 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 610 in FIG. 6 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 6, some of the REs may include control information in PSCCH and some REs may include demodulation RS (DMRS). At least one symbol may be used for feedback. FIG. 6 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may include the data message described herein. The position of any of the data, DMRS, SCI, feedback, gap symbols, and/or LBT symbols may be different than the example illustrated in FIG. 6. Multiple slots may be aggregated together in some aspects.

Figure 7:
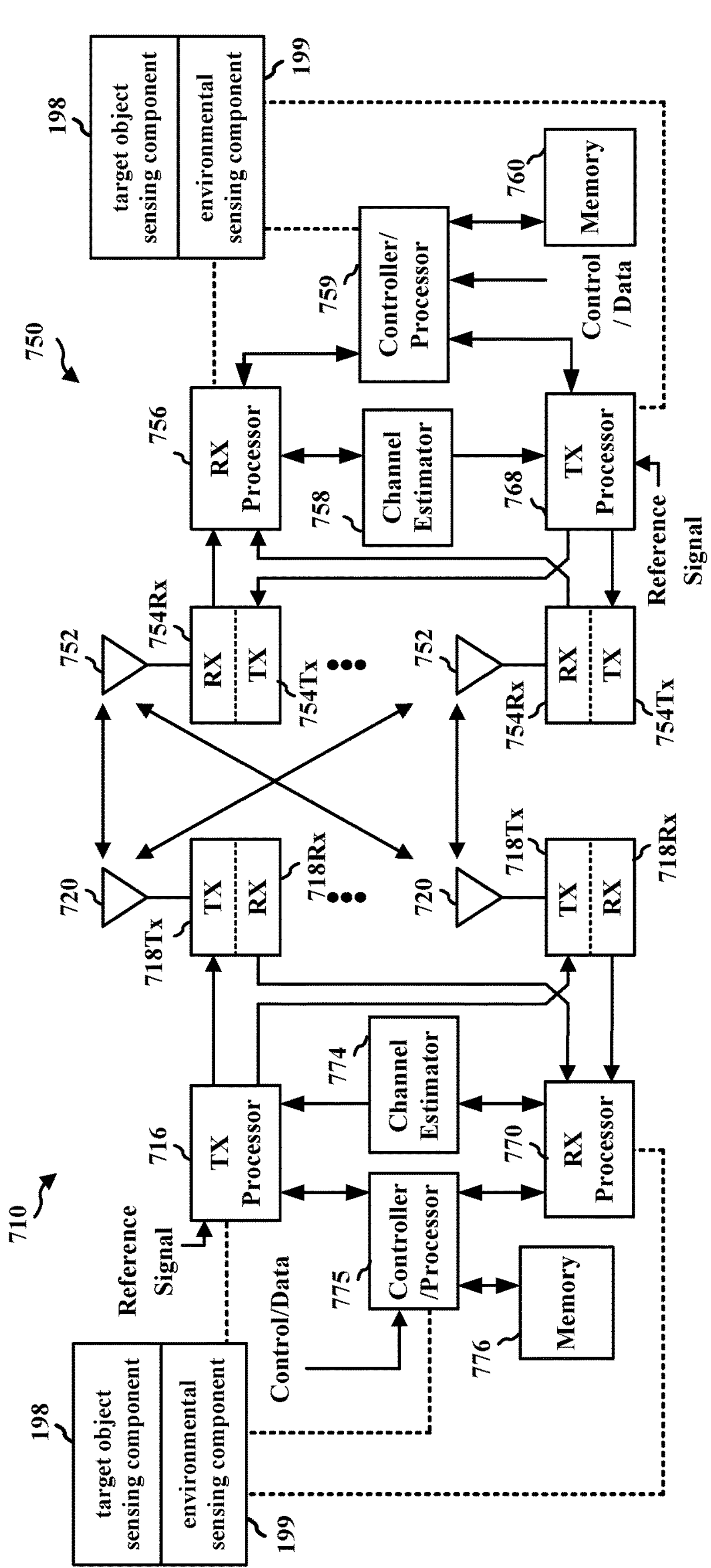
FIG. 7 is a diagram illustrating an example of a first device and a second device involved in wireless communication based, e.g., on sidelink.

FIG. 7 is a block diagram of a wireless device 710 in communication with a wireless device 750 based on sidelink. In some examples, the wireless devices 710 and 750 may communicate based on V2X or other D2D communication. The communication may be based on sidelink using a PC5 interface. The wireless devices 710 and 750 may include a UE, an RSU, a base station, etc. Packets may be provided to a controller/processor 775 that implements layer 7 and layer 2 functionality. Layer 7 includes a radio resource control (RRC) layer, and layer 2 includes a packet data convergence protocol (PDCP) layer, a radio link control (RLC) layer, and a medium access control (MAC) layer.

The transmit (TX) processor 716 and the receive (RX) processor 770 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 716 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 774 may be used to determine the coding and modulation scheme, as well as for spatial processing. The channel estimate may be derived from a reference signal and/or channel condition feedback transmitted by the wireless device 750. Each spatial stream may then be provided to a different antenna 720 via a separate transmitter 718Tx. Each transmitter 718Tx may modulate an RF carrier with a respective spatial stream for transmission.

At the wireless device 750, each receiver 754Rx receives a signal through its respective antenna 752. Each receiver 754Rx recovers information modulated onto an RF carrier and provides the information to the receive (Rx) processor 756. The TX processor 768 and the RX processor 756 implement layer 1 functionality associated with various signal processing functions. The RX processor 756 may perform spatial processing on the information to recover any spatial streams destined for the wireless device 750. If multiple spatial streams are destined for the wireless device 750, they may be combined by the RX processor 756 into a single OFDM symbol stream. The RX processor 756 then converts the OFDM symbol stream from the time-domain to the frequency domain using a Fast Fourier Transform (FFT). The frequency domain signal may include a separate OFDM symbol stream for each subcarrier of the OFDM signal. The symbols on each subcarrier, and the reference signal, are recovered and demodulated by determining the most likely signal constellation points transmitted by the wireless device 710. These soft decisions may be based on channel estimates computed by the channel estimator 758. The soft decisions are then decoded and deinterleaved to recover the data and control signals that were originally transmitted by the wireless device 710 on the physical channel. The data and control signals are then provided to the controller/processor 759, which implements layer 7 and layer 2 functionality.

The controller/processor 759 can be associated with a memory 760 that stores program codes and data. The memory 760 may be referred to as a computer-readable medium. The controller/processor 759 may provide demultiplexing between transport and logical channels, packet reassembly, deciphering, header decompression, and control signal processing. The controller/processor 759 is also responsible for error detection using an ACK and/or NACK protocol to support HARQ operations.

Similar to the functionality described in connection with the transmission by the wireless device 710, the controller/processor 759 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 758 from a reference signal or feedback transmitted by the wireless device 710 may be used by the TX processor 768 to select the appropriate coding and modulation schemes, and to facilitate spatial processing. The spatial streams generated by the TX processor 768 may be provided to different antenna 752 via separate transmitters 754Tx. Each transmitter 754Tx may modulate an RF carrier with a respective spatial stream for transmission.

The transmission is processed at the wireless device 710 in a manner similar to that described in connection with the receiver function at the wireless device 750. Each receiver 718Rx receives a signal through its respective antenna 720. Each receiver 718Rx recovers information modulated onto an RF carrier and provides the information to a RX processor 770.

The controller/processor 775 can be associated with a memory 776 that stores program codes and data. The memory 776 may be referred to as a computer-readable medium. The controller/processor 775 provides demultiplexing between transport and logical channels, packet reassembly, deciphering, header decompression, control signal processing. The controller/processor 775 is also responsible for error detection using an ACK and/or NACK protocol to support HARQ operations.

At least one of the TX processor 768, the RX processor 756, and the controller/processor 759 may be configured to perform aspects in connection with the target object sensing component 198 of FIG. 1.

At least one of the TX processor 768, the RX processor 756, and the controller/processor 759 may be configured to perform aspects in connection with the environmental sensing component 199 of FIG. 1.

At least one of the TX processor 716, the RX processor 770, and the controller/processor 775 may be configured to perform aspects in connection with the target object sensing component 198 of FIG. 1.

At least one of the TX processor 716, the RX processor 770, and the controller/processor 775 may be configured to perform aspects in connection the environmental sensing component 199 of FIG. 1.

Figure 8:
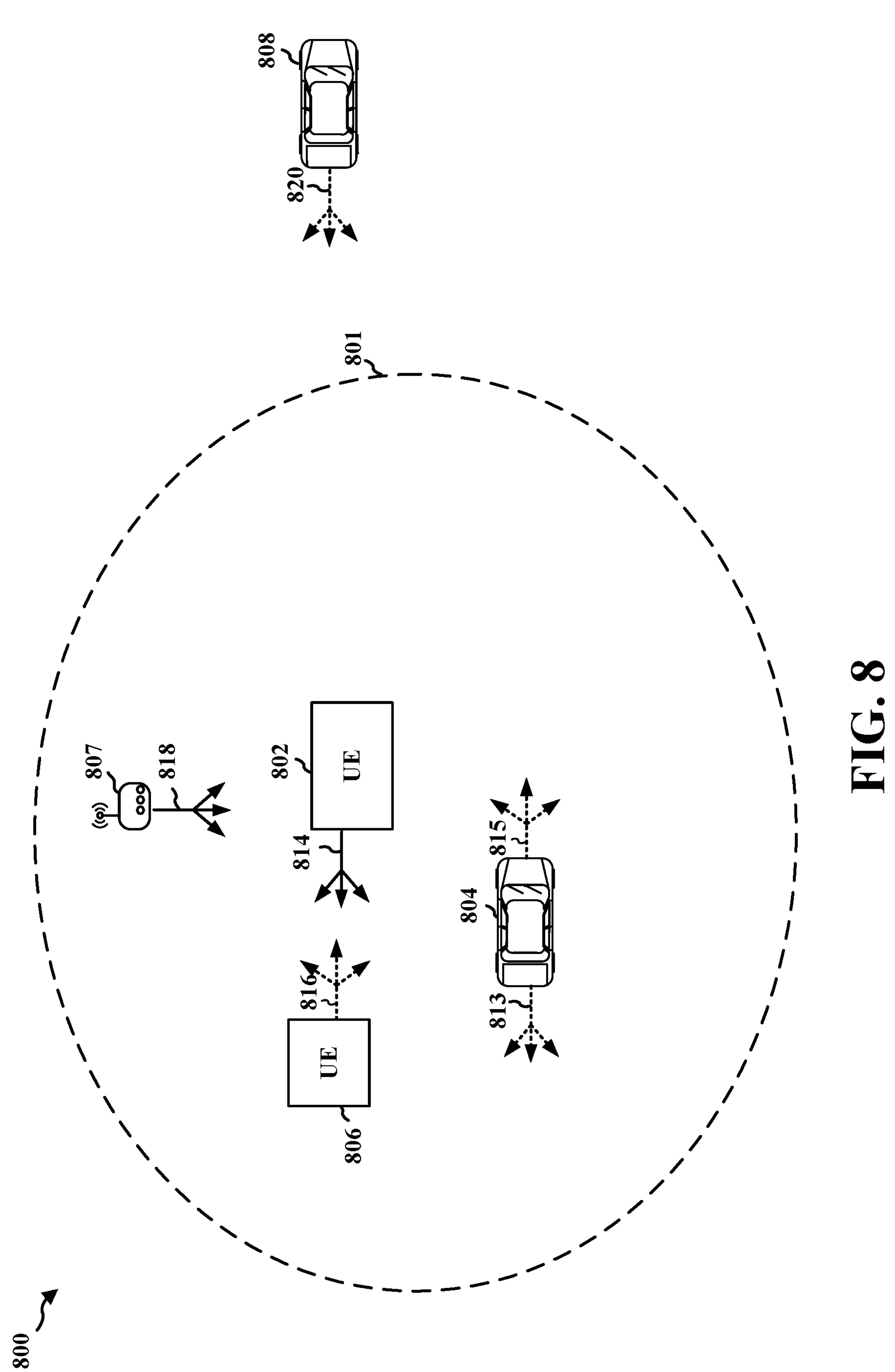
FIG. 8 illustrates example aspects of sidelink communication between devices, in accordance with aspects presented herein.

FIG. 8 illustrates an example 800 of sidelink communication between wireless devices. The communication may be based on a slot structure that may include aspects described in connection with FIG. 6. For example, the UE 802 may transmit a sidelink transmission 814, e.g., including a control channel (e.g., PSCCH) and/or a corresponding data channel (e.g., PSSCH), that may be received by UEs 804, 806, 808. A control channel may include information (e.g., sidelink control information (SCI)) for decoding the data channel including reservation information, such as information about time and/or frequency resources that are reserved for the data channel transmission. For example, the SCI may indicate a number of TTIs, as well as the RBs that will be occupied by the data transmission. The SCI may also be used by receiving devices to avoid interference by refraining from transmitting on the reserved resources. The UEs 802, 804, 806, 808 may each be capable of sidelink transmission in addition to sidelink reception. Thus, UEs 804, 806, 808 are illustrated as transmitting sidelink transmissions 813, 815, 816, 820. The sidelink transmissions 813, 814, 815, 816, 820 may be unicast, broadcast or multicast to nearby devices. For example, UE 804 may transmit sidelink transmissions 813, 815 intended for receipt by other UEs within a range 801 of UE 804, and UE 806 may transmit sidelink transmission 816. Additionally, or alternatively, the RSU 807 may receive communication from and/or transmit communication 818 to UEs 802, 804, 806, 808. One or more of the UEs 802, 804, 806, 808 or the RSU 807 may include a target object sensing component 198 and/or an environmental sensing component 199 as described in connection with FIG. 1.

Sidelink communication may be based on different types or modes of resource allocation mechanisms. In a first resource allocation mode (which may be referred to as "Mode 1"), centralized resource allocation may be provided by a network entity. For example, a base station 102 may determine resources for sidelink communication and may allocate resources to different UEs 104 to use for sidelink transmissions. In this first mode, a UE receives the allocation of sidelink resources from the base station 102. In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. Devices communicating based on sidelink, may determine one or more radio resources in the time and frequency domain that are used by other devices in order to select transmission resources that avoid collisions with other devices.

The sidelink transmission and/or the resource reservation may be periodic or aperiodic, where a UE may reserve resources for transmission in a current slot and up to two future slots (discussed below).

Thus, in the second mode (e.g., Mode 2), individual UEs may autonomously select resources for sidelink transmission, e.g., without a central entity such as a base station indicating the resources for the device. A first UE may reserve the selected resources in order to inform other UEs about the resources that the first UE intends to use for sidelink transmission(s).

In some examples, the resource selection for sidelink communication may be based on a sensing-based mechanism. For instance, before selecting a resource for a data transmission, a UE may first determine whether resources have been reserved by other UEs.

For example, as part of a sensing mechanism for resource allocation mode 2, the UE may determine (e.g., sense) whether the selected sidelink resource has been reserved by other UE(s) before selecting a sidelink resource for a data transmission. If the UE determines that the sidelink resource has not been reserved by other UEs, the UE may use the selected sidelink resource for transmitting the data, e.g., in a PSSCH transmission. The UE may estimate or determine which radio resources (e.g., sidelink resources) may be in-use and/or reserved by others by detecting and decoding sidelink control information (SCI) transmitted by other UEs. The UE may use a sensing-based resource selection algorithm to estimate or determine which radio resources are in-use and/or reserved by others. The UE may receive SCI from another UE that includes reservation information based on a resource reservation field in the SCI. The UE may continuously monitor for (e.g., sense) and decode SCI from peer UEs. The SCI may include reservation information, e.g., indicating slots and RBs that a particular UE has selected for a future transmission. The UE may exclude resources that are used and/or reserved by other UEs from a set of candidate resources for sidelink transmission by the UE, and the UE may select/reserve resources for a sidelink transmission from the resources that are unused and therefore form the set of candidate resources. The UE may continuously perform sensing for SCI with resource reservations in order to maintain a set of candidate resources from which the UE may select one or more resources for a sidelink transmission. Once the UE selects a candidate resource, the UE may transmit SCI indicating its own reservation of the resource for a sidelink transmission. The number of resources (e.g., sub-channels per subframe) reserved by the UE may depend on the size of data to be transmitted by the UE. Although the example is described for a UE receiving reservations from another UE, the reservations may also be received from an RSU or other device communicating based on sidelink.

Figure 9:
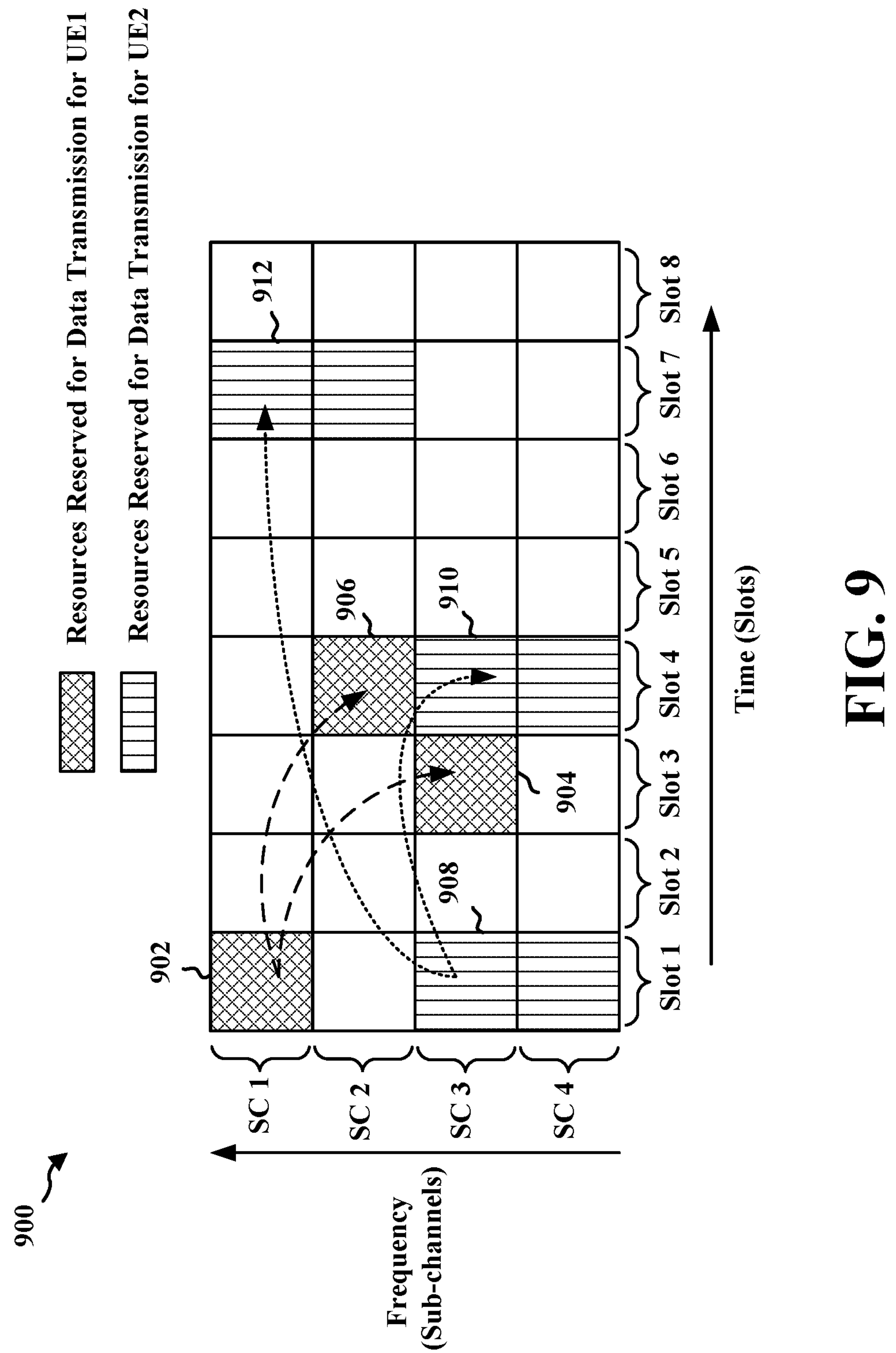
FIG. 9 illustrates examples of resource reservation for sidelink communication.

FIG. 9 is an example 900 of time and frequency resources showing reservations for sidelink transmissions. The resources may be included in a sidelink resource pool, for example. The resource allocation for each UE may be in units of one or more sub-channels in the frequency domain (e.g., sub-channels SC1 to SC 4), and may be based on one slot in the time domain. The UE may also use resources in the current slot to perform an initial transmission, and may reserve resources in future slots for retransmissions. In this example, two different future slots may be reserved by UE1 and UE2 for retransmissions. The resource reservation may be limited to a window of a pre-defined slots and sub-channels, such as an 8 time slots by 4 sub-channels window as shown in example 900, which provides 32 available resource blocks in total. This window may also be referred to as a resource selection window.

A first UE ("UE1) may reserve a sub-channel (e.g., SC 1) in a current slot (e.g., slot 1) for its initial data transmission 902, and may reserve additional future slots within the window for data retransmissions (e.g., 904 and 906). For example, UE1 may reserve sub-channels SC 3 at slots 3 and SC 2 at slot 4 for future retransmissions as shown by FIG. 4. UE1 then transmits information regarding which resources are being used and/or reserved by it to other UE(s). UE1 may do by including the reservation information in the reservation resource field of the SCI, e.g., a first stage SCI.

FIG. 9 illustrates that a second UE ("UE2") reserves resources in sub-channels SC 3 and SC 4 at time slot 1 for the data transmission 908, and data transmission 910 at time slot 4 using sub-channels SC 3 and SC 4, and data transmission 912 at time slot 7 using sub-channels SC 1 and SC 2 as shown by FIG. 9. Similarly, UE2 may transmit the resource usage and reservation information to other UE(s), such as using the reservation resource field in SCI.

A third UE may consider resources reserved by other UEs within the resource selection window to select resources to transmit its data. The third UE may first decode SCIs within a time period to identify which resources are available (e.g., candidate resources). For example, the third UE may exclude the resources reserved by UE1 and UE2 and may select other available sub-channels and time slots from the candidate resources for its transmission and retransmissions, which may be based on a number of adjacent sub-channels in which the data (e.g., packet) to be transmitted can fit.

While FIG. 9 illustrates resources being reserved for an initial transmission and two retransmissions, the reservation may be for an initial transmission and a single transmission or for an initial transmission.

The UE may determine an associated signal measurement (such as RSRP) for each resource reservation received by another UE. The UE may consider resources reserved in a transmission for which the UE measures an RSRP below a threshold to be available for use by the UE. A UE may perform signal/channel measurement for a sidelink resource that has been reserved and/or used by other UE(s), such as by measuring the RSRP of the message (e.g., the SCI) that reserves the sidelink resource. Based at least in part on the signal/channel measurement, the UE may consider using/reusing the sidelink resource that has been reserved by other UE(s). For example, the UE may exclude the reserved resources from a candidate resource set if the measured RSRP meets or exceeds the threshold, and the UE may consider a reserved resource to be available if the measured RSRP for the message reserving the resource is below the threshold. The UE may include the resources in the candidate resources set and may use/reuse such reserved resources when the message reserving the resources has an RSRP below the threshold, because the low RSRP indicates that the other UE is distant and a reuse of the resources is less likely to cause interference to that UE. A higher RSRP indicates that the transmitting UE that reserved the resources is potentially closer to the UE and may experience higher levels of interference if the UE selected the same resources.

For example, in a first step, the UE may determine a set of candidate resources (e.g., by monitoring SCI from other UEs and removing resources from the set of candidate resources that are reserved by other UEs in a signal for which the UE measures an RSRP above a threshold value). In a second step, the UE may select N resources for transmissions and/or retransmissions of a TB. As an example, the UE may randomly select the N resources from the set of candidate resources determined in the first step. In a third step, for each transmission, the UE may reserve future time and frequency resources for an initial transmission and up to two retransmissions. The UE may reserve the resources by transmitting SCI indicating the resource reservation. For example, in the example in FIG. 9, the UE may transmit SCI reserving resources for data transmissions 908, 910, and 912.

Figure 10:
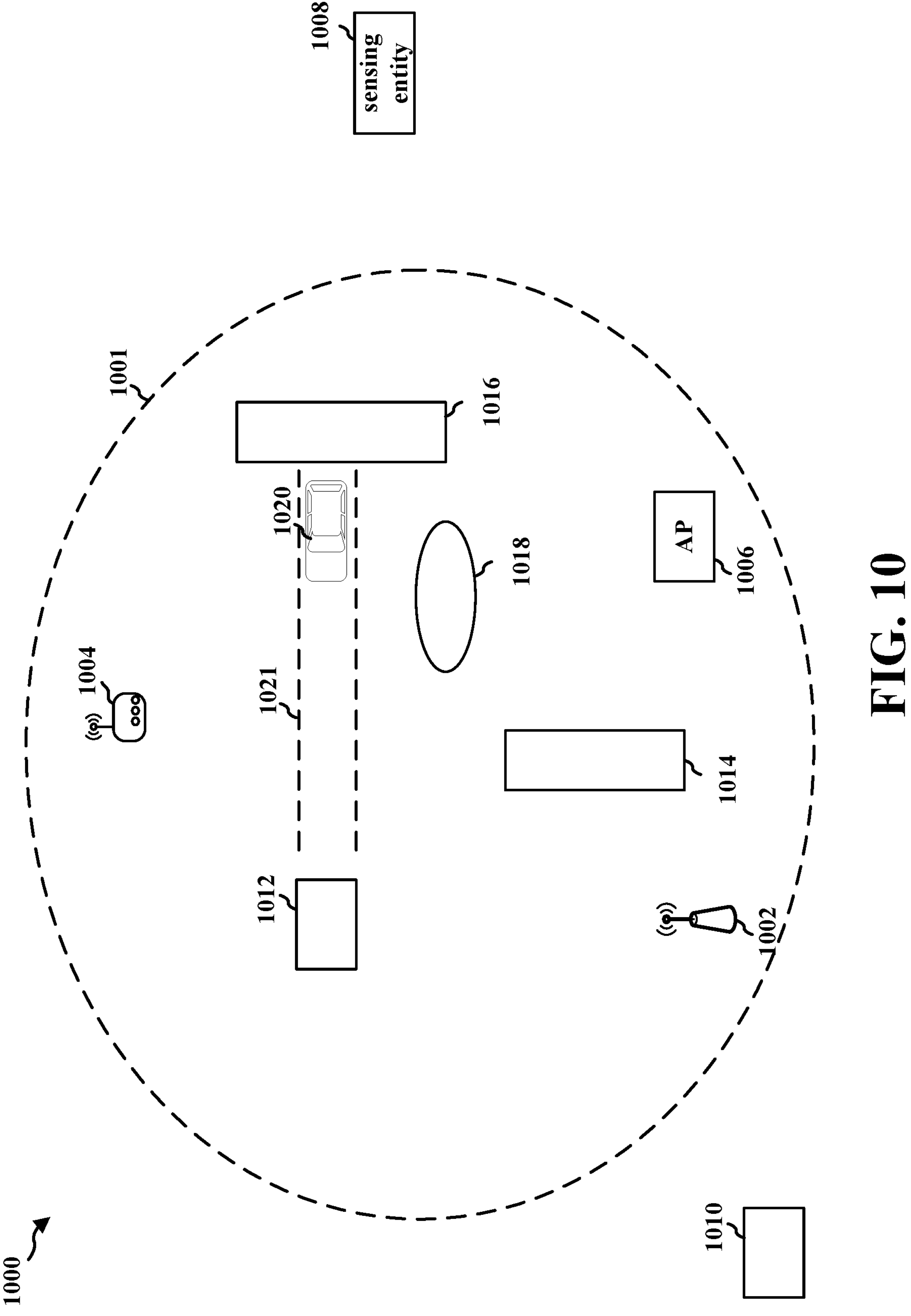
FIG. 10 is a diagram illustrating an example of an area with a plurality of sensing entities and objects.

FIG. 10 is a diagram 1000 illustrating an example of a set of sensing entities configured to perform sensing on objects in an area. The set of sensing entities may include a sensing entity 1002, a sensing entity 1004, a sensing entity 1006, and/or a sensing entity 1008. The sensing entity 1002 may be a network node. The sensing entity 1004 may be an RSU. The sensing entity 1006 may be an access point (AP). The sensing entity 1008 may be a UE. The objects that the set of sensing entities perform sensing on may include the object 1010, the object 1012, the object 1014, the object 1016, the object 1018, and/or the object 1020. At least one of the objects may include a material that may reflect a sensing signal transmitted at the object, for example a metal or a liquid. One or more of the set of sensing entities may perform sensing on objects about each sensing entity in order to determine sensing information about each sensing entity.

A sensing entity may collect deterministic background information about the sensing entity. The deterministic background information may include one or more locations of known objects in a sensing scene, or a sensing environment. The deterministic background information may include the dimensions of sensed objects. The objects may include, for example, furniture, desks, machinery in a factory, electric poles, power lines, building structures, or signs. In some aspects, a sensing entity may categorize deterministic background information to be static and present in a sensing scene for at least a threshold amount of time (e.g., hours). In some aspects, a sensing entity that stores deterministic background information may leverage the known object locations to cancel their clutter reflections or ignore their clutter reflections when performing target detection.

In some aspects, a sensing entity may collect deterministic background information about stationary objects, such as the object 1010, the object 1012, the object 1014, the object 1016, and the object 1018. For example, the sensing entity 1002, the sensing entity 1004, and the sensing entity 1006 may perform sensing on the object 1010, the object 1012, the object 1014, the object 1016, and the object 1018 within a period of time (e.g., every five minutes for an hour) and may determine that each of the object 1010, the object 1012, the object 1014, the object 1016, and the object 1018 do not move during the period of time. Each of the sensing entities may determine that the objects are static based on the attribute information associated with each of the objects being within a threshold value throughout the period of time. In some aspects, the sensing entities may be configured to communicate with one another to build a multi-dimensional model of a sensing scene, or a sensing environment. For example, the sensing entity 1002 may capture a first set of reflected sensing signals reflecting off of a first wall of the object 1012, and the sensing entity 1004 may capture a second set of reflected sensing signals reflecting off of a second wall of the object 1012. One of the sensing entities may combine the attribute information collected by the sensing entity 1002 and the sensing entity 1004 to determine the dimensions of the object 1012 having both walls that reflected the sensing signals.

A sensing entity may collect stochastic background information. The stochastic background information may include a statistical description of reflectivity of unknown or partially known objects in a sensing scene, or a sensing environment. In some aspects, the statistical description may include a Rayleigh distribution, a log-normal distribution, or a K-distribution. Stochastic background information may include variable background information or nondeterministic parts of a sensing scene, or a sensing environment. Stochastic background information may include, for example, mobile objects that move in predicted patterns about the sensing entity. The stochastic background information may include partial knowledge of objects in a sensing scene, or a sensing environment. In some aspects, a sensing entity may leverage a probability distribution that describes the background clutter information, for example a mean value of clutter or a median value of clutter. The probability distribution may be used by a sensing entity to enhance target detection by properly detecting detection thresholds or by selecting optimal sensing parameters (e.g., an optimal sensing waveform or an optimal sensing strategy). In some aspects, a sensing entity may use a probability distribution to select a clutter rejection methodology to enhance sensing. For example, a sensing entity may reject clutter by tuning the detection threshold based on constant false alarm (CFAR) processing until the detection threshold, as applied, causes less than a threshold number of CFARs for each of a set of sampling periods.

In some aspects, the stochastic background information may be indicated as a probability distribution with a set of parameters. For example, for a frequency range of 60-60.4 GHz and an elevation angle of 0-5 degrees, the sensing entity may indicate that the background clutter has a log normal distribution with a standard value $x_s$ dB and median value $x_m$ dB. In other aspects, the stochastic background information may be indicated as a mean/kth percentile value (e.g., median). For example, for a frequency range of 60-60.4 GHz and an elevation angle of 0-5 degrees, the sensing entity may indicate that the median of background clutter has a value of $x_m$ dB.

In some aspects, a sensing entity may collect stochastic background information about mobile objects, such as the object 1020 moving along the path 1021. The object 1020 may be, for example, an automated guided vehicle (AGV) that is configured to move along the path 1021. For example, the sensing entity 1002, the sensing entity 1004, and the sensing entity 1006 may perform sensing on the object 1020 within a period of time (e.g., every five minutes for an hour) and may determine that each of the object 1020 moves along the path 1021 during the period of time. Each of the sensing entities may determine that the object 1020 is nondeterministic based on the attribute information associated with the object 1020 throughout the period of time. The sensing entities may collect partial information on the object 1020, for example dimensions of the object 1020, average velocity of the object 1020, and the probability of the object 1020 being in a certain location. One or more of the sensing entities may build a statistical description of the probability of the object 1020 being in different locations about the path 1021. The statistical description may be provided as background clutter information, such as a mean value of background clutter or median value of background clutter.

A sensing entity may use either, or both, deterministic and/or stochastic background information to filter out objects when performing sensing on a target object. The statistical background information may be collected as a function of operating frequency and beam angles at the Tx and/or Rx sides. A set of sensing entities may work cooperatively to build such background information. For example, the sensing entity 1002 may transmit a set of sensing signals that may reflect off of the object 1010, the object 1012, the object 1014, the object 1016, and the object 1018. Each of the sensing entity 1002, the sensing entity 1004, and the sensing entity 1006 may measure the reflected sensing signals to determine attributes of the sensing scene or sensing environment. Similarly, the sensing entity 1004 transmit a set of sensing signals that may reflect off of the object 1010, the object 1012, the object 1014, the object 1016, and the object 1018. Each of the sensing entity 1002, the sensing entity 1004, and the sensing entity 1006 may measure the reflected sensing signals to determine attributes of the sensing scene or sensing environment, and so on and so forth.

The sensing entity 1002, the sensing entity 1004, and/or the sensing entity 1006 may cooperatively build a database of background information that may be used to filter out objects when performing sensing within the area 1001. The sensing entity 1008 may be a new sensing entity, such as a UE, that may be configured to perform sensing on objects within the area 1001. One or more of the sensing entity 1002, the sensing entity 1004, and/or the sensing entity 1006 may transmit background information from a previous history of sensing to the sensing entity 1008, such that the sensing entity 1008 may leverage the background information to perform sensing on a target object. This allows the sensing entity 1008 to perform sensing on objects within the area 1001 without performing lengthy benchmarking of background information of a sensing scene or a sensing environment. The background information may be transmitted as sensing assistance data.

Figure 11:
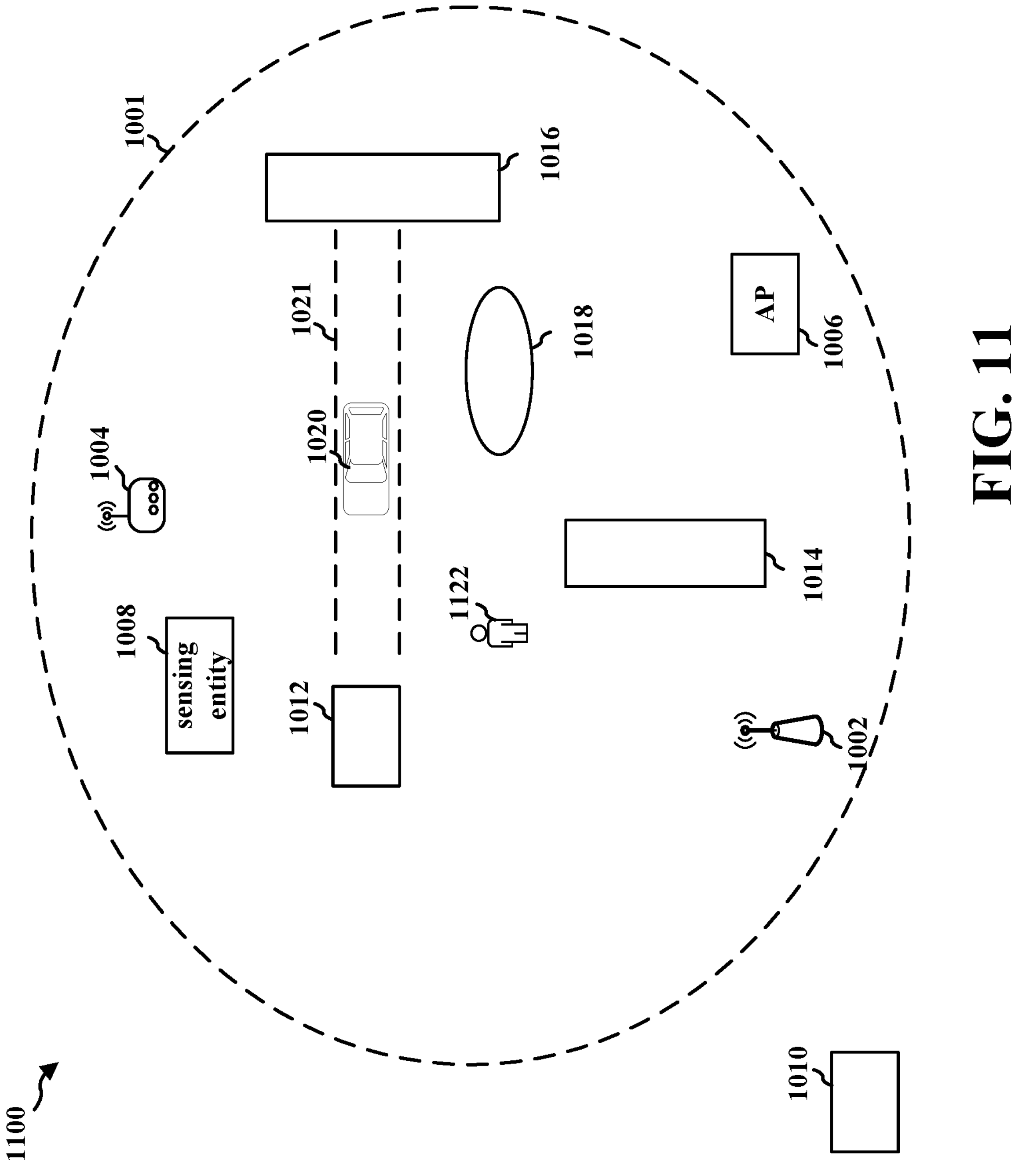
FIG. 11 is another diagram illustrating an example of the area of FIG. 10 with a plurality of sensing entities and objects.

In some aspects, a set of sensing entities may be configured to automatically transmit background information to a first sensing entity when the first sensing entity enters an area. For example, in response to the sensing entity 1008 entering the area 1001 in FIG. 11, at least one of the sensing entity 1002, the sensing entity 1004, and/or the sensing entity 1006 may transmit sensing assistance data to the sensing entity 1008 for use in performing sensing on the target object 1122. FIG. 11 shows a diagram 1100 with the sensing entity 1008 within the area 1001 configured to perform sensing on the target object 1122. The sensing entity 1008 may communicate its location to a network node, such as a TRP or an AP, and upon determining that the sensing entity 1008 is within the area 1001, a sensing entity may transmit sensing assistance data to the sensing entity 1008. The target object 1122 may be a human that is moving about in the area 1001. In some aspects, a set of sensing entities may transmit a beacon signal or a sidelink synchronization signal block ((S-SSB) that includes sensing assistance data such that any sensing entity that enters the area 1001 may receive the sensing assistance data. The sensing assistance data may include a frequency and/or angle of sensing signals used by the sensing entity to gather the sensing data. In some aspects, the sensing assistance data may include all data collected about objects about the set of sensing entities.

In some aspects, sensing assistance data may include a subset of data collected about objects about the set of sensing entities. For example, a set of sensing entities may collect information about the object 1010, the object 1012, the object 1014, the object 1016, and the object 1018, but may transmit sensing assistance data associated with the object 1012, the object 1014, the object 1016, and the object 1018 and not associated with the object 1010, as the object, the object 1014, the object 1016, and the object 1018 are within the area 1001. Such filtered data may be transmitted in response to a request by the sensing entity 1008 to transmit sensing assistance data associated with the area 1001. Such filtered data may be transmitted based on designated area boundaries such that a block of sensing assistance data is associated with a designated area with a set of designated area boundaries. (e.g., a first set of sensing assistance data associated with a first area identifier and a second set of sensing assistance data associated with a second area identifier)

In some aspects, a set of sensing entities may be configured to automatically transmit a capability message that indicates that a sensing entity may provide background information upon request. The capability message may be transmitted as a beacon or as an S-SSB. The capability message may include a set of candidate frequencies and/or candidate angles that may be requested. For example, a sensing entity may collect sensing data using a set of candidate frequencies and a set of candidate angles. The sensing entity may provide these frequencies and/or angles in a capability message, and a sensing entity receiving the capability message may request background information associated with a subset of the frequencies and/or subset of the angles. For example, at least one of the sensing entity 1002, the sensing entity 1004, and/or the sensing entity 1006 may transmit a capability message indicating that it may provide background information upon request. The sensing entity 1008 may receive the capability message and may, in response, transmit a request for background information from at least one of the sensing entity 1002, the sensing entity 1004, and/or the sensing entity 1006. The request may include a selection of specific frequencies and/or angles associated with the background information. In response to receiving a request, a sensing entity may then transmit the associated background information to the sensing entity 1008, for example as sensing assistance data.

In some aspects, the sensing entity 1008 may request at least one of the sensing entity 1002, the sensing entity 1004, and/or the sensing entity 1006 to provide background information of a certain area, for example the area 1001. At least one of the sensing entity 1002, the sensing entity 1004, and/or the sensing entity 1006 may provide background information associated with objects in the area 1001 to the sensing entity 1008. The background information may be in the form of a list of observed objects from a given TRP. The detection may be described by a range and/or an angle with respect to the TRP. The background information may be in the form of a stochastic/statistical description of clutter (e.g., probability distribution or mean/median value of the clutter reflectivity expressed in dB). In some aspects, if a sensing entity receiving such a request does not have relevant background information (e.g., no background information associated with the area 1001, no background information associated with a set of selected frequencies and/or angles in the request), may return an error response. The background information may be provided as sensing assistance data. The background information may be provided in a positioning system information block (POS-SIB), a sensing system information block (sensing-SIB), or a dedicated message for providing sensing assistance data. The sensing entity 1008 may receive the background information and use the background information to perform sensing and enhance sensing results of the target object 1122.

In some aspects, at least one of the sensing entity 1002, the sensing entity 1004, and/or the sensing entity 1006 may provide the sensing entity 1008 with an indication that it may provide background information associated with the area 1001. Based on the indication, the sensing entity 1008 may request background information from at least one of the sensing entity 1002, the sensing entity 1004, and/or the sensing entity 1006. In some aspects, the request may be on a per-TRP basis. For example, the sensing entity 1008 may transmit a request that includes a list of TRP identifiers (IDs) that the sensing entity 1008 wishes to receive background information from. In some aspects, the request may be on an operating frequency and/or a sensing beam angle basis. For example, the sensing entity 1008 may transmit a request that includes a list of operating frequencies and/or sensing beam angles associated with the background information. The sensing entity providing the background information may provide the information based on the granularity requested by the sensing entity 1008. In some aspects, the sensing entity may provide the background information without waiting for a request from the sensing entity 1008. (e.g., as a periodic broadcast or in response to detecting that the sensing entity 1008 has entered the area 1001). In some aspects, the sensing entity may broadcast that background information is available and may wait for the sensing entity 1008 to transmit a request that solicits specific background information, such as information associated with selected frequencies and/or beam angles indicated in the broadcast.

In some aspects, the background information may be exchanged via sidelink communication. For example, the sensing entity 1008 may be a UE and the sensing entity 1002 may be a UE, and the sensing entity 1008 and the sensing entity 1002 may exchange background information through sidelink UE-to-UE communication. The sharing may happen though a first UE transmitting a background information request to a second UE and the second UE transmitting the background information to the first UE. The sharing may happen through a second UE advertising its background information availability in a broadcast message (e.g., as part of an S-SSB or as a beacon signal). The second UE may be a dedicated sensing UE (e.g., an RSU deployed for positioning and potentially sensing purposes). The second UE may advertise its background information at the beginning of a positioning session. For example, the second UE may be an anchor UE for a positioning session initiated by the first UE, and the second UE may then advertise its background information capability in response to receiving a positioning session request from the first UE. The sharing of the background information data may occur using sidelink communication techniques in a cellular technology, using Wi-Fi, or UWB.

Figure 12:
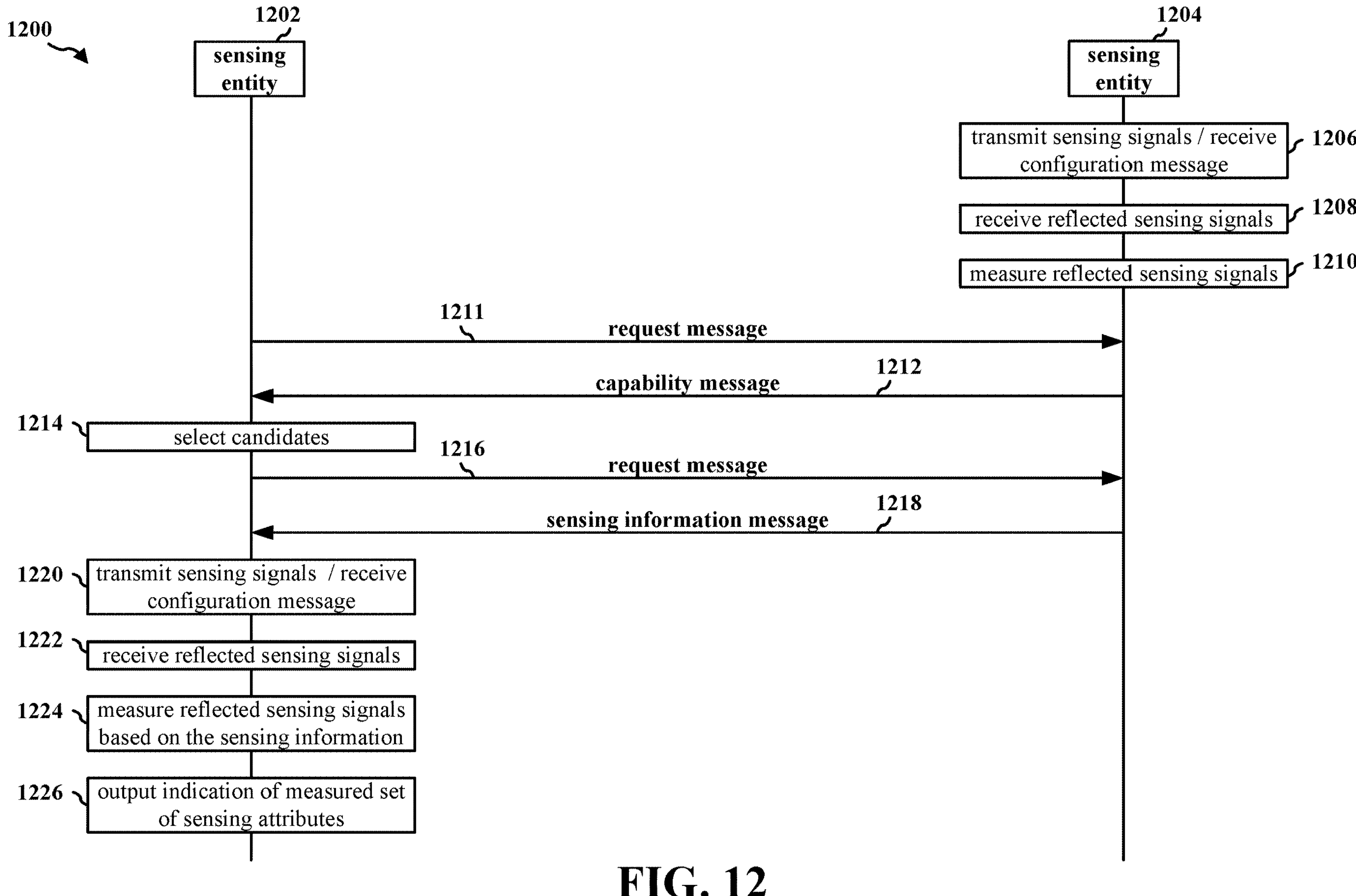
FIG. 12 is a connection flow diagram illustrating an example of communications between sensing entities.

FIG. 12 is a connection flow diagram 1200 illustrating an example of communications between the sensing entity 1202 and the sensing entity 1204. The sensing entity 1202 may be a UE, a network node, a TRP, an SMF, or an RSU. The sensing entity 1204 may be a UE, a network node, a TRP, an SMF, or an RSU. The sensing entity 1204 may have a known location, allowing sensing signals measured by the sensing entity 1204 to have location-sensitive context that may be useful for the sensing entity 1202. The sensing entity 1204 may aggregate sensing data from a set of sensing entities, allowing the sensing entity 1204 to act as a way-point for providing sensing information to the sensing entity 1202.

In some aspects, at 1206, the sensing entity 1204 may transmit a set of sensing signals. The set of sensing signals may be transmitted using a set of beam frequencies and a set of beam angles. The set of sensing signals may reflect off of objects about the sensing entity 1204, for example metal objects or objects with enough water to reflect RF signals.

In some aspects, at 1206, the sensing entity 1204 may receive a configuration message including a configuration for a set of sensing signals. The sensing entity 1204 may receive the configuration message from another sensing entity that transmits the sensing signals, or another sensing entity that configures sensing entities to transmit a set of sensing signals at a sensing area. The configuration message may include a configuration for the set of sensing signals, for example an indicator of when the set of sensing signals are transmitted, a periodicity for the set of sensing signals, a bandwidth, a location that the set of sensing signals are transmitted from, and/or a sensing area including objects that the sensing signals may reflect off of to be received by the sensing entity 1204.

At 1208, the sensing entity 1204 may receive reflected sensing signals from the objects about the sensing entity 1204. The sensing entity 1204 may receive the reflected sensing signals based on a configuration that the sensing entity 1204 configures for the sensing signals. The sensing entity 1204 may receive the reflected sensing signals based on a configuration received in a configuration message at 1206. At 1210, the sensing entity 1204 may measure the reflected sensing signals to determine a set of sensing attributes associated with the objects about the sensing entity 1204. The set of sensing attributes may include deterministic information, such as locations and/or dimensions of known objects about the sensing entity 1204. The deterministic information may include a set of locations of objects within a sensing area. The deterministic information may include a set of dimensions associated with the objects within a sensing area (e.g., height, width, dimensions, material). The set of sensing attributes may include stochastic information. The stochastic information may include a statistical description of reflectivity of unknown or partially known objects about the sensing entity 1204. The stochastic information may include a probability distribution of clutter information measured by a set of sensing entities for reflected sensing signals from the sensing area. The stochastic information may include a mean value of clutter reflectivity measured by a set of sensing entities for reflected sensing signals from the sensing area. The stochastic information may include a median value of clutter reflectivity measured by a set of sensing entities for reflected sensing signals from the sensing area. The deterministic or stochastic information may include a set of sensing signal frequencies that correspond with the set of sensing signals. The deterministic or stochastic information may include a set of sensing signal beam angles (e.g., AoA, AoD) that correspond with the set of sensing signals. The deterministic or stochastic information may include a set of ranges associated with the set of objects and a TRP. In other words, the information may include the distance between each of the set of objects and the TRP. The TRP may be the TRP that transmitted the set of sensing signals, or may be a TRP with a known location that transmitted sensing signals that were later measured by a set of sensing entities. The deterministic or stochastic information may include a set of angles associated with the set of objects and a TRP. In other words, the information may include the angles between each of the set of objects and the TRP. The angles may represent, for example, AoA and/or AoD beam angles. The deterministic or stochastic information may include a location of the TRP.

The sensing entity 1204 may transmit a capability message 1212 to the sensing entity 1202. The sensing entity 1202 may receive the capability message 1212 from the sensing entity 1204. The capability message 1212 may include a beacon signal or an S-SSB. The capability message 1212 may include an indication that the sensing entity 1204 is capable of transmitting sensing attributes. The capability message may include a set of candidate frequencies and/or a set of candidate angles associated with the sensing attributes. The capability message may include a set of areas associated with the sensing attributes. The capability message may include a set of sensing entities associated with the sensing attributes. Such an indication may be useful where the sensing entity 1204 is capable of aggregating sensing attribute data from the set of sensing entities.

In some aspects, the sensing entity 1204 may transmit the capability message 1212 periodically to an area capable of receiving reflected sensing signals from a sensing area associated with the capability message 1212. In other aspects, the sensing entity 1204 may transmit the capability message 1212 in response to a request message 1211 received from the sensing entity 1202. For example, the sensing entity 1204 may transmit the capability message 1212 as part of a process to initialize a positioning session. In some aspects, the sensing entity 1202 may transmit a request message 1211 to the sensing entity 1204 to initiate a positioning session. The sensing entity 1202 may be an initiator UE and the sensing entity 1204 may be an anchor UE. As the sensing entity 1204 initializes the positioning session, the sensing entity 1204 may transmit the capability message 1212 to advertise its background information. This allows the sensing entity 1202 to perform positioning with the sensing entity 1204 to obtain its location relative to the sensing entity 1204, and also allows the sensing entity 1202 to understand attributes of a sensing area from which the sensing entity 1204 may receive reflected sensing signals.

At 1214, in response to receiving the capability message 1212, the sensing entity 1202 may select a subset of candidates based on the capability message 1212. For example, the sensing entity 1202 may select a subset of frequencies and/or angles indicated in the capability message 1212. In another example, the sensing entity 1202 may select a subset of areas indicated in the capability message 1212. In another example, the sensing entity 1202 may select a subset of sensing entities indicated in the capability message 1212. The sensing entity 1202 may transmit a request message 1216 at the sensing entity 1204. The sensing entity 1204 may receive the request message 1216 from the sensing entity 1202. The request message 1216 may include a request for the sensing entity 1204 to transmit a set of sensing attributes. The request message 1216 may include an indication of the selection performed at 1214.

The sensing entity 1204 may transmit a sensing information message 1218 to the sensing entity 1202. The sensing entity 1202 may receive the sensing information message 1218. The sensing entity 1204 may transmit the sensing information message 1218 in response to receiving the request message 1216. The sensing information message 1218 may include sensing attributes that are associated with the selection indicated in the request message 1216. The sensing entity 1204 may transmit the sensing information message 1218 in response to a trigger, for example in response to determining that the sensing entity 1202 enters an area that the sensing entity 1204 collects sensing data for, or in response to a threshold amount of time passing (e.g., transmits the sensing information message 1218 periodically). The sensing information message 1218 may include a sensing background information message that includes a POS-SIB or a sensing-SIB. The sensing information message 1218 may include sensing assistance data. The sensing information message 1218 may include at least one of (a) a set of locations of a first subset of the set of objects within the area, (b) a set of dimensions associated with a second subset of the set of objects within the area. (c) a probability distribution of clutter information associated with the area. (d) a mean value of a clutter reflectivity associated with the area, (e) a median value of the clutter reflectivity associated with the area, (f) a set of sensing signal frequencies associated with the set of sensing signals, (g) a set of sensing signal beam angles associated with the set of sensing signals, (h) a set of ranges associated with the set of objects and a transmission reception point (TRP), (i) a set of angles associated with the set of objects and the TRP, or (j) a location of the TRP. The sensing entity 1202 may use the information in the sensing information message 1218 to distinguish between sensing data from a target object and sensing data from known, partially known, and unknown background objects.

In some aspects, at 1220, the sensing entity 1202 may transmit a set of sensing signals. The set of sensing signals may be transmitted using a set of beam frequencies and a set of beam angles. At least some of the set of beam frequencies or the set of beam angles may be shared with the reflected sensing signals received by the sensing entity 1204.

In some aspects, at 1220, the sensing entity 1202 may receive a configuration message including a configuration for a set of sensing signals. The sensing entity 1202 may receive the configuration message from another sensing entity that transmits the sensing signals, or another sensing entity that configures sensing entities to transmit a set of sensing signals at a sensing area. The configuration message may include a configuration for the set of sensing signals, for example an indicator of when the set of sensing signals are transmitted, a periodicity for the set of sensing signals, a bandwidth, a location that the set of sensing signals are transmitted from, and/or a sensing area including objects that the sensing signals may reflect off of to be received by the sensing entity 1202.

The set of sensing signals transmitted by the sensing entity 1202 or another sensing entity configured to transmit the set of sensing signals may reflect off of objects about the sensing entity 1202, for example metal objects or objects with enough water to reflect RF signals. The sensing signals may reflect off of one or more target objects that the sensing entity 1202 wishes to track. At 1222, the sensing entity 1202 may receive reflected sensing signals from the objects about the sensing entity 1202. The sensing entity 1202 may receive the reflected sensing signals based on a configuration that the sensing entity 1202 configures for the sensing signals. The sensing entity 1202 may receive the reflected sensing signals based on a configuration received in a configuration message at 1220. At 1224, the sensing entity 1202 may measure the reflected sensing signals to calculate a set of sensing attributes associated with the one or more target objects about the sensing entity 1202. The sensing entity 1202 may measure the reflected sensing signals based on the information in the sensing information message 1218. For example, the sensing entity 1202 may use the information in the sensing information message 1218 to separate the target object of interest from background environment reflections.

At 1226, the sensing entity 1202 may output an indication of the measured set of sensing attributes. For example, the sensing entity 1202 may output the indication to a component of the sensing entity for storage on a memory or a cache of the sensing entity. In one aspect, the sensing entity 1202 may be similar to the apparatus 1704, and may store the set of sensing attributes on the memory 1724', the memory 1706', or the memory 1726. In another aspect, the sensing entity 1202 may transmit the indication to a wireless device, for example another sensing entity or a core network component, such as an LMF. The measured set of sensing attributes may be transmitted to another sensing entity that receives reflected sensing signals from the same sensing area, or a portion of the same sensing area, allowing the other sensing entity to make more accurate measurements without much initialization. The other sensing entity may use the measured set of sensing attributes to perform sensing in the area with more accurate information than if the other sensing entity received measured sensing attributes from the sensing entity 1204 without receiving the indication of the measured set of sensing attributes from the sensing entity 1202.

FIG. 13 is a flowchart 1300 of a method of wireless communication. The method may be performed by a first sensing entity (e.g., the UE 104, the UE 350, the UE 802, the UE 804, the UE 806, the UE 808; the base station 102; the base station 310; the RSU 107; the wireless device 402, the wireless device 404, the wireless device 406, the wireless device 502, the wireless device 504, the wireless device 506, the wireless device 508; the wireless device 710; the wireless device 750; the sensing entity 1002, the sensing entity 1004, the sensing entity 1006, the sensing entity 1008, the sensing entity 1202, the sensing entity 1204; the apparatus 1704; the network entity 1702, the network entity 1802, the network entity 1960). At 1302, the first sensing entity may receive, from a second sensing entity, a sensing information message that may include a first set of sensing attributes associated with a set of objects within an area associated with the first sensing entity. For example, 1302 may be performed by the sensing entity 1202 in FIG. 12, which may receive, from the sensing entity 1204, a sensing information message 1218 that may include a first set of sensing attributes associated with a set of objects within an area associated with the sensing entity 1202. In one aspect, the sensing entity 1204 in FIG. 12 may be similar to the sensing entity 1008 in FIGS. 10 and 11, where the first set of sensing attributes may be associated with the object 1012, the object 1014, the object 1016, and the object 1018 within the area 1001 in FIGS. 10 and 11. Moreover, 1302 may be performed by the component 198 in FIG. 1, 3, 7, 17, 18, or 19.

At 1304, the first sensing entity may transmit a set of sensing signals at a target object. For example, 1304 may be performed by the sensing entity 1202 in FIG. 12, which may, at 1220, transmit a set of sensing signals at a target object. In one aspect, the sensing entity 1204 in FIG. 12 may be similar to the sensing entity 1008 in FIGS. 10 and 11, where the sensing entity 1008 may transmit a set of sensing signals at the objects within the area 1001. Moreover, 1304 may be performed by the component 198 in FIG. 1, 3, 7, 17, 18, or 19.

At 1306, the first sensing entity may receive a set of reflected sensing signals based on the set of sensing signals and the target object. For example, 1306 may be performed by the sensing entity 1202 in FIG. 12, which may, at 1222, receive a set of reflected sensing signals based on the set of sensing signals and the target object. In one aspect, the sensing entity 1204 in FIG. 12 may be similar to the sensing entity 1008 in FIGS. 10 and 11, where the sensing entity 1008 may receive a set of reflected sensing signals reflected off of the objects within the area 1001, for example the target object 1122. Moreover, 1306 may be performed by the component 198 in FIG. 1, 3, 7, 17, 18, or 19.

At 1308, the first sensing entity may measure a second set of sensing attributes associated with the target object based on the set of reflected sensing signals and the first set of sensing attributes. For example, 1308 may be performed by the sensing entity 1202 in FIG. 12, which may, at 1224, measure a second set of sensing attributes associated with the target object based on the set of reflected sensing signals and the first set of sensing attributes. In one aspect, the sensing entity 1204 in FIG. 12 may be similar to the sensing entity 1008 in FIGS. 10 and 11, where the sensing entity 1008 may measure a set of sensing attributes associated with the target object 1122 based on the reflected sensing signals and the known set of sensing attributes associated with the object 1012, the object 1014, the object 1016, and the object 1018 within the area 1001. Moreover, 1308 may be performed by the component 198 in FIG. 1, 3, 7, 17, 18, or 19.

Figure 14:
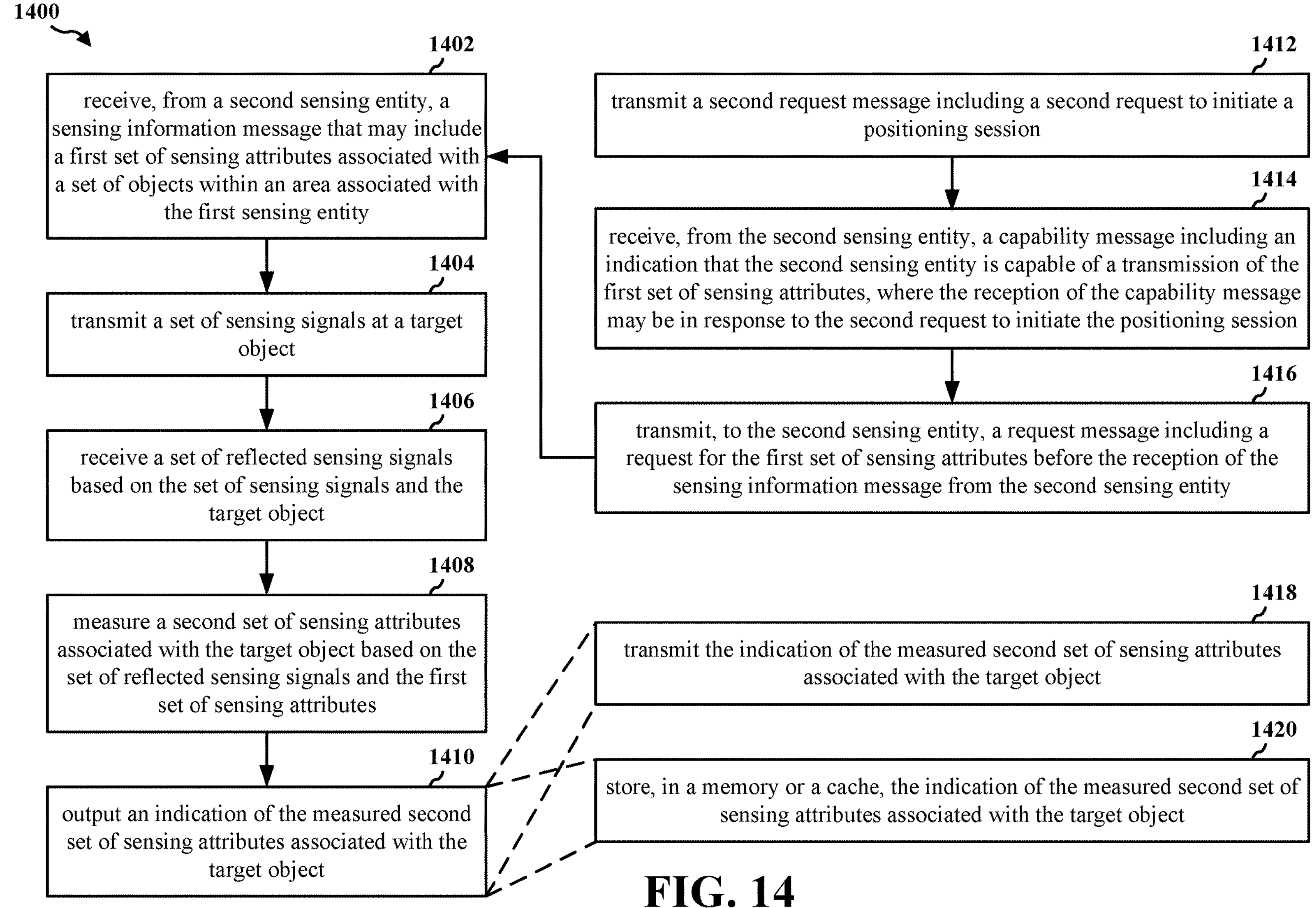
FIG. 14 is a flowchart of a method of wireless communication.

FIG. 14 is a flowchart 1400 of a method of wireless communication. The method may be performed by a first sensing entity (e.g., the UE 104, the UE 350, the UE 802, the UE 804, the UE 806, the UE 808; the base station 102; the base station 310; the RSU 107; the wireless device 402, the wireless device 404, the wireless device 406, the wireless device 502, the wireless device 504, the wireless device 506, the wireless device 508; the wireless device 710; the wireless device 750; the sensing entity 1002, the sensing entity 1004, the sensing entity 1006, the sensing entity 1008, the sensing entity 1202, the sensing entity 1204; the apparatus 1704; the network entity 1702, the network entity 1802, the network entity 1960). At 1402, the first sensing entity may receive, from a second sensing entity, a sensing information message that may include a first set of sensing attributes associated with a set of objects within an area associated with the first sensing entity. For example, 1402 may be performed by the sensing entity 1202 in FIG. 12, which may receive, from the sensing entity 1204, a sensing information message 1218 that may include a first set of sensing attributes associated with a set of objects within an area associated with the sensing entity 1202. In one aspect, the sensing entity 1204 in FIG. 12 may be similar to the sensing entity 1008 in FIGS. 10 and 11, where the first set of sensing attributes may be associated with the object 1012, the object 1014, the object 1016, and the object 1018 within the area 1001 in FIGS. 10 and 11. Moreover, 1402 may be performed by the component 198 in FIG. 1, 3, 7, 17, 18, or 19.

At 1404, the first sensing entity may transmit a set of sensing signals at a target object. For example, 1404 may be performed by the sensing entity 1202 in FIG. 12, which may, at 1220, transmit a set of sensing signals at a target object. In one aspect, the sensing entity 1204 in FIG. 12 may be similar to the sensing entity 1008 in FIGS. 10 and 11, where the sensing entity 1008 may transmit a set of sensing signals at the objects within the area 1001. Moreover, 1404 may be performed by the component 198 in FIG. 1, 3, 7, 17, 18, or 19.

At 1406, the first sensing entity may receive a set of reflected sensing signals based on the set of sensing signals and the target object. For example, 1406 may be performed by the sensing entity 1202 in FIG. 12, which may, at 1222, receive a set of reflected sensing signals based on the set of sensing signals and the target object. In one aspect, the sensing entity 1204 in FIG. 12 may be similar to the sensing entity 1008 in FIGS. 10 and 11, where the sensing entity 1008 may receive a set of reflected sensing signals reflected off of the objects within the area 1001, for example the target object 1122. Moreover, 1406 may be performed by the component 198 in FIG. 1, 3, 7, 17, 18, or 19.

At 1408, the first sensing entity may measure a second set of sensing attributes associated with the target object based on the set of reflected sensing signals and the first set of sensing attributes. For example, 1408 may be performed by the sensing entity 1202 in FIG. 12, which may, at 1224, measure a second set of sensing attributes associated with the target object based on the set of reflected sensing signals and the first set of sensing attributes. In one aspect, the sensing entity 1204 in FIG. 12 may be similar to the sensing entity 1008 in FIGS. 10 and 11, where the sensing entity 1008 may measure a set of sensing attributes associated with the target object 1122 based on the reflected sensing signals and the known set of sensing attributes associated with the object 1012, the object 1014, the object 1016, and the object 1018 within the area 1001. Moreover, 1408 may be performed by the component 198 in FIG. 1, 3, 7, 17, 18, or 19.

At 1410, the first sensing entity may output an indication of the measured second set of sensing attributes associated with the target object. For example, 1410 may be performed by the sensing entity 1202 in FIG. 12, which may, at 1226, output an indication of the measured second set of sensing attributes associated with the target object. Moreover, 1410 may be performed by the component 198 in FIG. 1, 3, 7, 17, 18, or 19.

At 1412, the first sensing entity may transmit a second request message including a second request to initiate a positioning session. For example, 1412 may be performed by the sensing entity 1202 in FIG. 12, which may transmit the request message 1211 to the sensing entity 1204. The request message 1211 may include a request to initiate a positioning session. Moreover, 1412 may be performed by the component 198 in FIG. 1, 3, 7, 17, 18, or 19.

At 1414, the first sensing entity may receive, from the second sensing entity, a capability message including an indication that the second sensing entity is capable of a transmission of the first set of sensing attributes. The reception of the capability message may be in response to the second request to initiate the positioning session. For example, 1414 may be performed by the sensing entity 1202 in FIG. 12, which may receive, from the sensing entity 1204, the capability message 1212. The capability message 1212 may include an indication that the sensing entity 1204 is capable of a transmission of a set of sensing attributes associated with an area. The reception of the capability message 1212 may be in response to the sensing entity 1204 receiving the request message 1211 including the request to initiate the positioning session. Moreover, 1414 may be performed by the component 198 in FIG. 1, 3, 7, 17, 18, or 19.

At 1416, the first sensing entity may transmit, to the second sensing entity, a request message. The request message may include a request for the first set of sensing attributes before the reception of the sensing information message from the second sensing entity. For example, 1416 may be performed by the sensing entity 1202 in FIG. 12, which may transmit, to the sensing entity 1204, the request message 1216. The request message 1216 may include a request for the set of sensing attributes before the reception of the sensing information message 1218 from the sensing entity 1204. Moreover, 1416 may be performed by the component 198 in FIG. 1, 3, 7, 17, 18, or 19.

At 1418, the first sensing entity may output the indication of the measured second set of sensing attributes associated with the target object by transmitting the indication of the measured second set of sensing attributes associated with the target object. For example, 1418 may be performed by the sensing entity 1202 in FIG. 12, which may transmit the indication of the set of sensing attributes measured at 1224 associated with the target object. Moreover, 1418 may be performed by the component 198 in FIG. 1, 3, 7, 17, 18, or 19.

At 1420, the first sensing entity may output the indication of the measured second set of sensing attributes associated with the target object by storing, in a memory or a cache, the indication of the measured second set of sensing attributes associated with the target object. For example, 1420 may be performed by the sensing entity 1202 in FIG. 12, which may store, in a memory or a cache (which may be a type of memory), the indication of the measured set of sensing attributes associated with the target object. Moreover, 1420 may be performed by the component 198 in FIG. 1, 3, 7, 17, 18, or 19.

Figure 15:
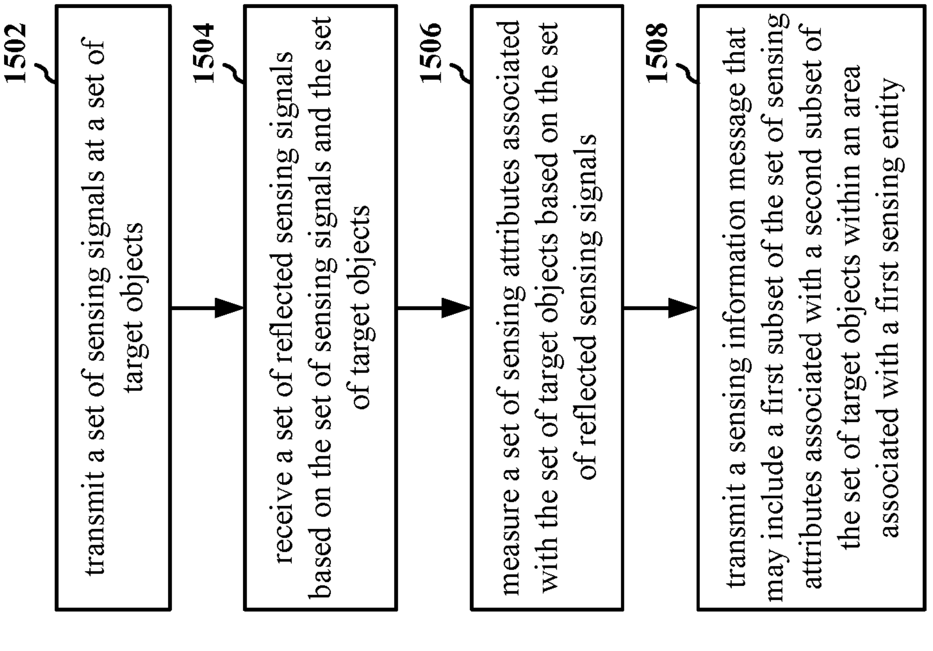
FIG. 15 is a flowchart of a method of wireless communication.

FIG. 15 is a flowchart 1500 of a method of wireless communication. The method may be performed by a second sensing entity (e.g., the UE 104, the UE 350, the UE 802, the UE 804, the UE 806, the UE 808; the base station 102; the base station 310; the RSU 107; the wireless device 402, the wireless device 404, the wireless device 406, the wireless device 502, the wireless device 504, the wireless device 506, the wireless device 508; the wireless device 710; the wireless device 750; the sensing entity 1002, the sensing entity 1004, the sensing entity 1006, the sensing entity 1008, the sensing entity 1202, the sensing entity 1204; the apparatus 1704; the network entity 1702, the network entity 1802, the network entity 1960). At 1502, the second sensing entity may transmit a set of sensing signals at a set of target objects. For example, 1502 may be performed by the sensing entity 1204 in FIG. 12, which may, at 1206, transmit a set of sensing signals at a set of target objects. In one aspect, the sensing entity 1204 may be similar to the sensing entity 1002 in FIGS. 10 and 11, which may transmit a set of sensing signals at the object 1010, the object 1012, the object 1014, the object 1016, and the object 1018. Moreover, 1502 may be performed by the component 199 in FIG. 1, 3, 7, 17, 18, or 19.

At 1504, the second sensing entity may receive a set of reflected sensing signals based on the set of sensing signals and the set of target objects. For example, 1504 may be performed by the sensing entity 1204 in FIG. 12, which may, at 1208, receive a set of reflected sensing signals based on the set of sensing signals and the set of target objects. In one aspect, the sensing entity 1204 may be similar to the sensing entity 1002 in FIGS. 10 and 11, which may receive a reflected set of sensing signals that are reflected off of the object 1010, the object 1012, the object 1014, the object 1016, and the object 1018. Moreover, 1504 may be performed by the component 199 in FIG. 1, 3, 7, 17, 18, or 19.

At 1506, the second sensing entity may measure a set of sensing attributes associated with the set of target objects based on the set of reflected sensing signals. For example, 1506 may be performed by the sensing entity 1204 in FIG. 12, which may, at 1210, measure a set of sensing attributes associated with the set of target objects based on the set of reflected sensing signals. In one aspect, the sensing entity 1204 may be similar to the sensing entity 1002 in FIGS. 10 and 11, which may measure a set of sensing attributes associated with the object 1010, the object 1012, the object 1014, the object 1016, and the object 1018 based on the set of reflected sensing signals. Moreover, 1506 may be performed by the component 199 in FIG. 1, 3, 7, 17, 18, or 19.

At 1508, the second sensing entity may transmit a sensing information message that may include a first subset of the set of sensing attributes associated with a second subset of the set of target objects within an area associated with a first sensing entity. For example, 1508 may be performed by the sensing entity 1204 in FIG. 12, which may transmit the sensing information message 1218 that may include a first subset of the set of sensing attributes associated with a second subset of the set of target objects within an area associated with a first sensing entity. In one aspect, the sensing entity 1204 may be similar to the sensing entity 1002 in FIGS. 10 and 11, which may transmit a sensing information message to the sensing entity 1008. The sensing information message may include the set of attributes associated with the object 1012, the object 1014, the object 1016, and the object 1018 within the area 1001, and may not include the set of attributes associated with the object 1010 that is outside of the area 1001, even if the sensing entity 1002 may have information on the object 1010. The sensing information message may help the sensing entity 1008 perform sensing on objects within the area 1001, such as the target object 1122 in FIG. 11. Moreover, 1508 may be performed by the component 199 in FIG. 1, 3, 7, 17, 18, or 19.

Figure 16:
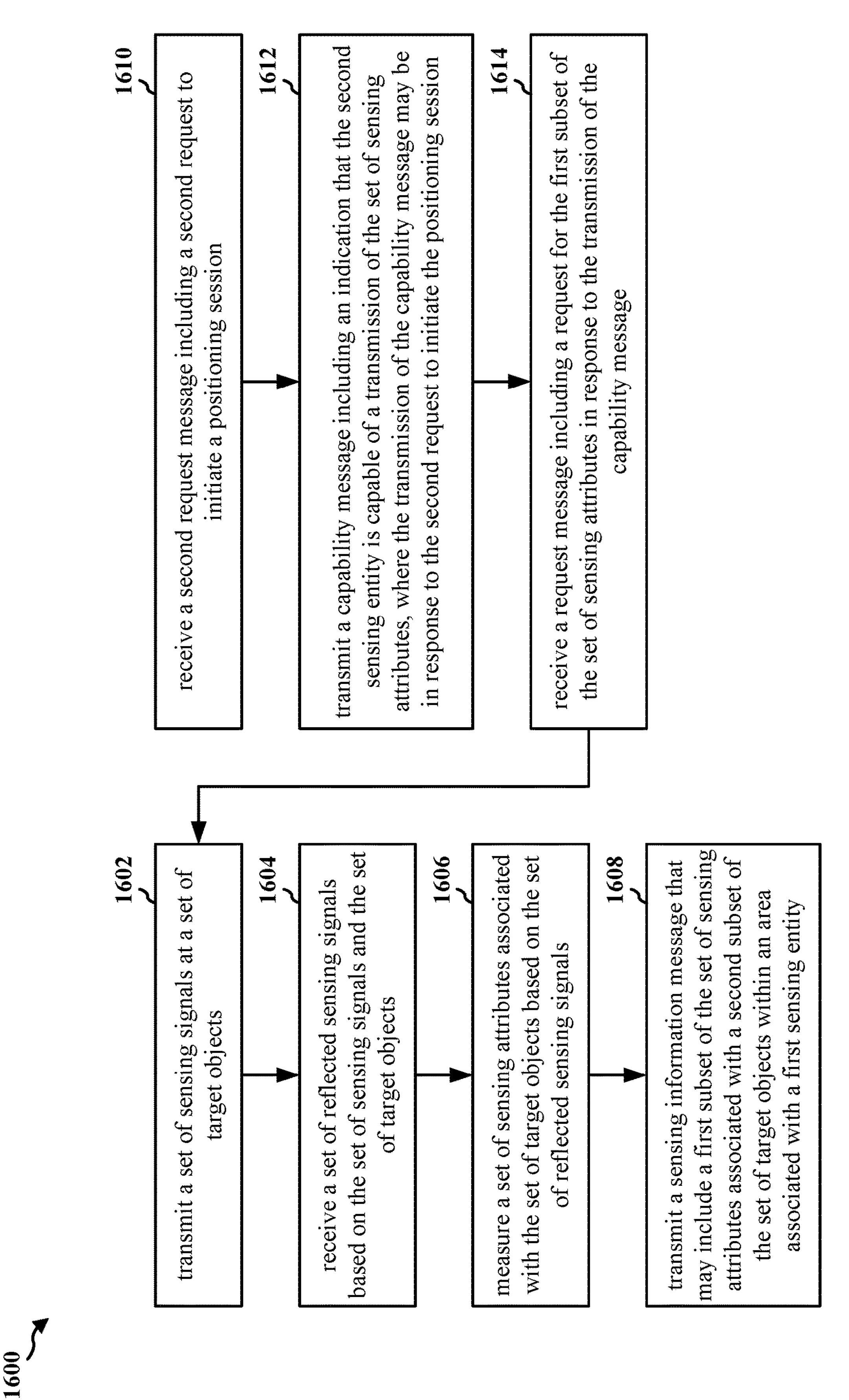
FIG. 16 is a flowchart of a method of wireless communication.

FIG. 16 is a flowchart 1600 of a method of wireless communication. The method may be performed by a second sensing entity (e.g., the UE 104, the UE 350, the UE 802, the UE 804, the UE 806, the UE 808; the base station 102; the base station 310; the RSU 107; the wireless device 402, the wireless device 404, the wireless device 406, the wireless device 502, the wireless device 504, the wireless device 506, the wireless device 508; the wireless device 710; the wireless device 750; the sensing entity 1002, the sensing entity 1004, the sensing entity 1006, the sensing entity 1008, the sensing entity 1202, the sensing entity 1204; the apparatus 1704; the network entity 1702, the network entity 1802, the network entity 1960). At 1602, the second sensing entity may transmit a set of sensing signals at a set of target objects. For example, 1602 may be performed by the sensing entity 1204 in FIG. 12, which may, at 1206, transmit a set of sensing signals at a set of target objects. In one aspect, the sensing entity 1204 may be similar to the sensing entity 1002 in FIGS. 10 and 11, which may transmit a set of sensing signals at the object 1010, the object 1012, the object 1014, the object 1016, and the object 1018. Moreover, 1602 may be performed by the component 199 in FIG. 1, 3, 7, 17, 18, or 19.

At 1604, the second sensing entity may receive a set of reflected sensing signals based on the set of sensing signals and the set of target objects. For example, 1604 may be performed by the sensing entity 1204 in FIG. 12, which may, at 1208, receive a set of reflected sensing signals based on the set of sensing signals and the set of target objects. In one aspect, the sensing entity 1204 may be similar to the sensing entity 1002 in FIGS. 10 and 11, which may receive a reflected set of sensing signals that are reflected off of the object 1010, the object 1012, the object 1014, the object 1016, and the object 1018. Moreover, 1604 may be performed by the component 199 in FIG. 1, 3, 7, 17, 18, or 19.

At 1606, the second sensing entity may measure a set of sensing attributes associated with the set of target objects based on the set of reflected sensing signals. For example, 1606 may be performed by the sensing entity 1204 in FIG. 12, which may, at 1210, measure a set of sensing attributes associated with the set of target objects based on the set of reflected sensing signals. In one aspect, the sensing entity 1204 may be similar to the sensing entity 1002 in FIGS. 10 and 11, which may measure a set of sensing attributes associated with the object 1010, the object 1012, the object 1014, the object 1016, and the object 1018 based on the set of reflected sensing signals. Moreover, 1606 may be performed by the component 199 in FIG. 1, 3, 7, 17, 18, or 19.

At 1608, the second sensing entity may transmit a sensing information message that may include a first subset of the set of sensing attributes associated with a second subset of the set of target objects within an area associated with a first sensing entity. For example, 1608 may be performed by the sensing entity 1204 in FIG. 12, which may transmit the sensing information message 1218 that may include a first subset of the set of sensing attributes associated with a second subset of the set of target objects within an area associated with a first sensing entity. In one aspect, the sensing entity 1204 may be similar to the sensing entity 1002 in FIGS. 10 and 11, which may transmit a sensing information message to the sensing entity 1008. The sensing information message may include the set of attributes associated with the object 1012, the object 1014, the object 1016, and the object 1018 within the area 1001, and may not include the set of attributes associated with the object 1010 that is outside of the area 1001, even if the sensing entity 1002 may have information on the object 1010. The sensing information message may help the sensing entity 1008 perform sensing on objects within the area 1001, such as the target object 1122 in FIG. 11. Moreover, 1608 may be performed by the component 199 in FIG. 1, 3, 7, 17, 18, or 19.

At 1610, the second sensing entity may receive a second request message including a second request to initiate a positioning session. For example, 1610 may be performed by the sensing entity 1204 in FIG. 12, which may receive the request message 1211. The request message 1211 may include a request to initiate a positioning session. Moreover, 1610 may be performed by the component 199 in FIG. 1, 3, 7, 17, 18, or 19.

At 1612, the second sensing entity may transmit a capability message including an indication that the second sensing entity is capable of a transmission of the set of sensing attributes, where the transmission of the capability message may be in response to the second request to initiate the positioning session. For example, 1612 may be performed by the sensing entity 1204 in FIG. 12, which may transmit the capability message 1212 to the sensing entity 1202. The capability message 1212 may include an indication that the sensing entity 1204 is capable of a transmission of the set of sensing attributes. The transmission of the capability message 1212 may be in response to the sensing entity 1204 receiving the request message 1211 including the request to initiate the positioning session. Moreover, 1612 may be performed by the component 199 in FIG. 1, 3, 7, 17, 18, or 19.

At 1614, the second sensing entity may receive a request message. The request message may include a request for the first subset of the set of sensing attributes in response to the transmission of the capability message. For example, 1614 may be performed by the sensing entity 1204 in FIG. 12, which may receive the request message 1216. The request message 1216 may include a request for some of the set of sensing attributes associated with an area that the sensing entity 1202 indicates in response to the transmission of the capability message 1212. Moreover, 1614 may be performed by the component 199 in FIG. 1, 3, 7, 17, 18, or 19.

Figure 17:
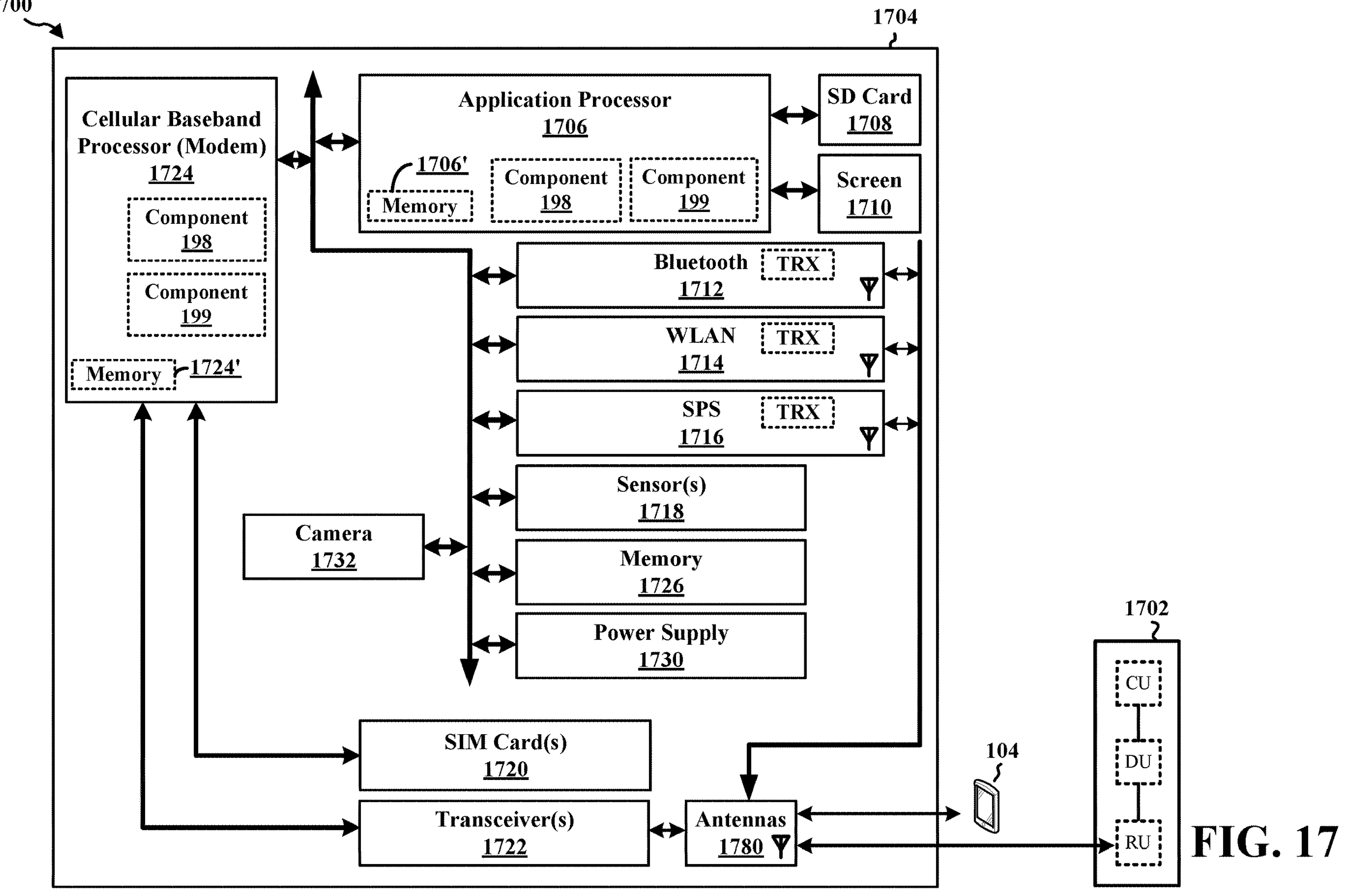
FIG. 17 is a diagram illustrating an example of a hardware implementation for an example apparatus and/or network entity.

FIG. 17 is a diagram 1700 illustrating an example of a hardware implementation for an apparatus 1704. The apparatus 1704 may be a UE, a component of a UE, or may implement UE functionality. In some aspects, the apparatus 1504 may include at least one cellular baseband processor 1724 (also referred to as a modem) coupled to one or more transceivers 1722 (e.g., cellular RF transceiver). The cellular baseband processor(s) 1724 may include at least one on-chip memory 1724'. In some aspects, the apparatus 1704 may further include one or more subscriber identity modules (SIM) cards 1720 and at least one application processor 1706 coupled to a secure digital (SD) card 1708 and a screen 1710. The application processor(s) 1706 may include on-chip memory 1706'. In some aspects, the apparatus 1704 may further include a Bluetooth module 1712, a WLAN module 1714, an SPS module 1716 (e.g., GNSS module), one or more sensor modules 1718 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1726, a power supply 1730, and/or a camera 1732. The Bluetooth module 1712, the WLAN module 1714, and the SPS module 1716 may include an on-chip transceiver (TRX) (or in some cases, just a receiver (RX)). The Bluetooth module 1712, the WLAN module 1714, and the SPS module 1716 may include their own dedicated antennas and/or utilize the antennas 1780 for communication. The cellular baseband processor(s) 1724 communicates through the transceiver(s) 1722 via one or more antennas 1780 with the UE 104 and/or with an RU associated with a network entity 1702. The cellular baseband processor(s) 1724 and the application processor(s) 1706 may each include a computer-readable medium/memory 1724', 1706', respectively. The additional memory modules 1726 may also be considered a computer-readable medium/memory. Each computer-readable medium/memory 1724', 1706', 1726 may be non-transitory. The cellular baseband processor(s) 1724 and the application processor(s) 1706 are each responsible for general processing, including the execution of software stored on the computer-readable medium/memory. The software, when executed by the cellular baseband processor(s) 1724/application processor(s) 1706, causes the cellular baseband processor(s) 1724/application processor(s) 1706 to perform the various functions described supra. The computer-readable medium/memory may also be used for storing data that is manipulated by the cellular baseband processor(s) 1724/application processor(s) 1706 when executing software. The cellular baseband processor(s) 1724/application processor(s) 1706 may be a component of the UE 350 and may include the at least one memory 360 and/or at least one of the TX processor 368, the RX processor 356, and the controller/processor 359. In one configuration, the apparatus 1704 may be at least one processor chip (modem and/or application) and include just the cellular baseband processor(s) 1724 and/or the application processor(s) 1706, and in another configuration, the apparatus 1704 may be the entire UE (e.g., see UE 350 of FIG. 3) and include the additional modules of the apparatus 1704.

As discussed supra, the component 198 may be configured to receive, from a second sensing entity, a sensing information message that may include a first set of sensing attributes associated with a set of objects within an area associated with the first sensing entity. The component 198 may be configured to transmit a set of sensing signals at a target object. The component 198 may be configured to receive a set of reflected sensing signals based on the set of sensing signals and the target object. The component 198 may be configured to measure a second set of sensing attributes associated with the target object based on the set of reflected sensing signals and the first set of sensing attributes. The component 198 may be within the cellular baseband processor(s) 1724, the application processor(s) 1706, or both the cellular baseband processor(s) 1724 and the application processor(s) 1706. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1704 may include a variety of components configured for various functions. In one configuration, the apparatus 1704, and in particular the cellular baseband processor(s) 1724 and/or the application processor(s) 1706, may include means for receiving, from a second sensing entity, a sensing information message that may include a first set of sensing attributes associated with a set of objects within an area associated with the first sensing entity. The apparatus 1704 may include means for transmitting a set of sensing signals at a target object. The apparatus 1704 may include means for receiving a set of reflected sensing signals based on the set of sensing signals and the target object. The apparatus 1704 may include means for receiving a configuration message that may include a configuration for the set of sensing signals. The apparatus 1704 may include means for receiving the set of reflected sensing signals by receiving the set of reflected sensing signals based on the configuration. The apparatus 1704 may include means for measuring a second set of sensing attributes associated with the target object based on the set of reflected sensing signals and the first set of sensing attributes. The first set of sensing attributes may include at least one of (a) a set of locations of a first subset of the set of objects within the area, (b) a set of dimensions associated with a second subset of the set of objects within the area, (c) a probability distribution of clutter information associated with the area, (d) a mean value of a clutter reflectivity associated with the area, (e) a median value of the clutter reflectivity associated with the area, (f) a set of sensing signal frequencies associated with the set of sensing signals, (g) a set of sensing signal beam angles associated with the set of sensing signals, (h) a set of ranges associated with the set of objects and a transmission reception point (TRP), (i) a set of angles associated with the set of objects and the TRP, or (j) a location of the TRP. The sensing information message may be a sensing background information message including a POS-SIB or a sensing-SIB. The apparatus 1704 may include means for receiving, from the second sensing entity, a capability message that may include an indication that the second sensing entity is capable of a transmission of the first set of sensing attributes. The apparatus 1704 may include means for transmitting, to the second sensing entity, a request message that may include a request for the first set of sensing attributes before the reception of the sensing information message from the second sensing entity. The capability message may include at least one of a set of candidate frequencies or a set of candidate angles. The request message may include a second indication of a selection of at least one of a subset of candidate frequencies from the set of candidate frequencies or a subset of candidate angles from the set of candidate angles. At least one of the subset of candidate frequencies or the subset of candidate angles may be associated with the set of sensing signals. The capability message may include a set of areas. The set of areas may include the area associated with the first sensing entity. The request message may include a second indication of a selection of the area associated with the first sensing entity from the set of areas. The capability message may include a set of sensing entities capable of providing the first set of sensing attributes. The request message may include a second indication of a selection of a subset of sensing entities from the set of sensing entities. The subset of sensing entities may include the second sensing entity. The capability message may include at least one of a beacon signal or an S-SSB. The apparatus 1704 may include means for transmitting a second request message that may include a second request to initiate a positioning session. The reception of the capability message may be in response to the second request to initiate the positioning session. The sensing information message may include at least one of a sidelink communication message, a Wi-Fi message, or a UWB message. The second sensing entity may include one of a UE, a network node, a TRP, an SMF, or an RSU. The apparatus 1704 may include means for outputting an indication of the measured second set of sensing attributes associated with the target object. The apparatus 1704 may include means for outputting the indication of the measured second set of sensing attributes associated with the target object by transmitting the indication of the measured second set of sensing attributes associated with the target object. The apparatus 1704 may include means for outputting the indication of the measured second set of sensing attributes associated with the target object by storing, in a memory or a cache, the indication of the measured second set of sensing attributes associated with the target object. The means may be the component 198 of the apparatus 1704 configured to perform the functions recited by the means. As described supra, the apparatus 1704 may include the TX processor 368, the RX processor 356, and the controller/processor 359. As such, in one configuration, the means may be the TX processor 368, the RX processor 356, and/or the controller/processor 359 configured to perform the functions recited by the means.

As discussed supra, the component 199 may be configured to transmit a set of sensing signals at a set of target objects. The component 199 may be configured to receive a set of reflected sensing signals based on the set of sensing signals and the set of target objects. The component 199 may be configured to measure a set of sensing attributes associated with the set of target objects based on the set of reflected sensing signals. The component 199 may be configured to transmit a sensing information message that may include a first subset of the set of sensing attributes associated with a second subset of the set of target objects within an area associated with a first sensing entity. The component 199 may be within the cellular baseband processor(s) 1724, the application processor(s) 1706, or both the cellular baseband processor(s) 1724 and the application processor(s) 1706. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1704 may include a variety of components configured for various functions. In one configuration, the apparatus 1704, and in particular the cellular baseband processor(s) 1724 and/or the application processor(s) 1706, may include means for transmitting a set of sensing signals at a set of target objects. The apparatus 1704 may include means for receiving a set of reflected sensing signals based on the set of sensing signals and the set of target objects. The apparatus 1704 may include means for measuring a set of sensing attributes associated with the set of target objects based on the set of reflected sensing signals. The apparatus 1704 may include means for transmitting a sensing information message that may include a first subset of the set of sensing attributes associated with a second subset of the set of target objects within an area associated with a first sensing entity. The first subset of the set of sensing attributes may include at least one of (a) a set of locations of a third subset of the set of objects within the area, (b) a set of dimensions associated with a fourth subset of the set of target objects within the area, (c) a probability distribution of clutter information associated with the area, (d) a mean value of a clutter reflectivity associated with the area, (e) a median value of the clutter reflectivity associated with the area, (f) a set of sensing signal frequencies associated with the set of sensing signals, (g) a set of sensing signal beam angles associated with the set of sensing signals, (h) a set of ranges associated with the set of objects and a transmission reception point (TRP), (i) a set of angles associated with the set of objects and the TRP, or (j) a location of the TRP. The apparatus 1704 may include means for transmitting a capability message that may include an indication that the second sensing entity is capable of a transmission of the set of sensing attributes. The apparatus 1704 may include means for receiving a request message that may include a request for the first subset of the set of sensing attributes in response to the transmission of the capability message. The capability message may include at least one of a set of candidate frequencies or a set of candidate angles. The request message may include a second indication of a selection of at least one of a third subset of candidate frequencies from the set of candidate frequencies or a fourth subset of candidate angles from the set of candidate angles. At least one of the third subset of candidate frequencies or the fourth subset of candidate angles may be associated with a subset of the set of sensing signals. The capability message may include a set of areas associated with the set of target objects. The request message may include a second indication of a selection of the area associated with the first sensing entity from the set of areas. The set of areas may include the area associated with the first sensing entity. The capability message may include a set of sensing entities capable of providing the set of sensing attributes. The request message may include a second indication of selection of a subset of sensing entities from the set of sensing entities. The subset of sensing entities may include the second sensing entity. The capability message may include at least one of a beacon signal or an S-SSB. The apparatus 1704 may include means for receiving a second request message including a second request to initiate a positioning session. The transmission of the capability message may be in response to the second request to initiate the positioning session. The sensing information message may include at least one of a sidelink communication message, a Wi-Fi message, or a UWB message. The sensing information message may be a sensing background information message including a POS-SIB or a sensing-SIB. The means may be the component 199 of the apparatus 1704 configured to perform the functions recited by the means. As described supra, the apparatus 1704 may include the TX processor 368, the RX processor 356, and the controller/processor 359. As such, in one configuration, the means may be the TX processor 368, the RX processor 356, and/or the controller/processor 359 configured to perform the functions recited by the means.

Figure 18:
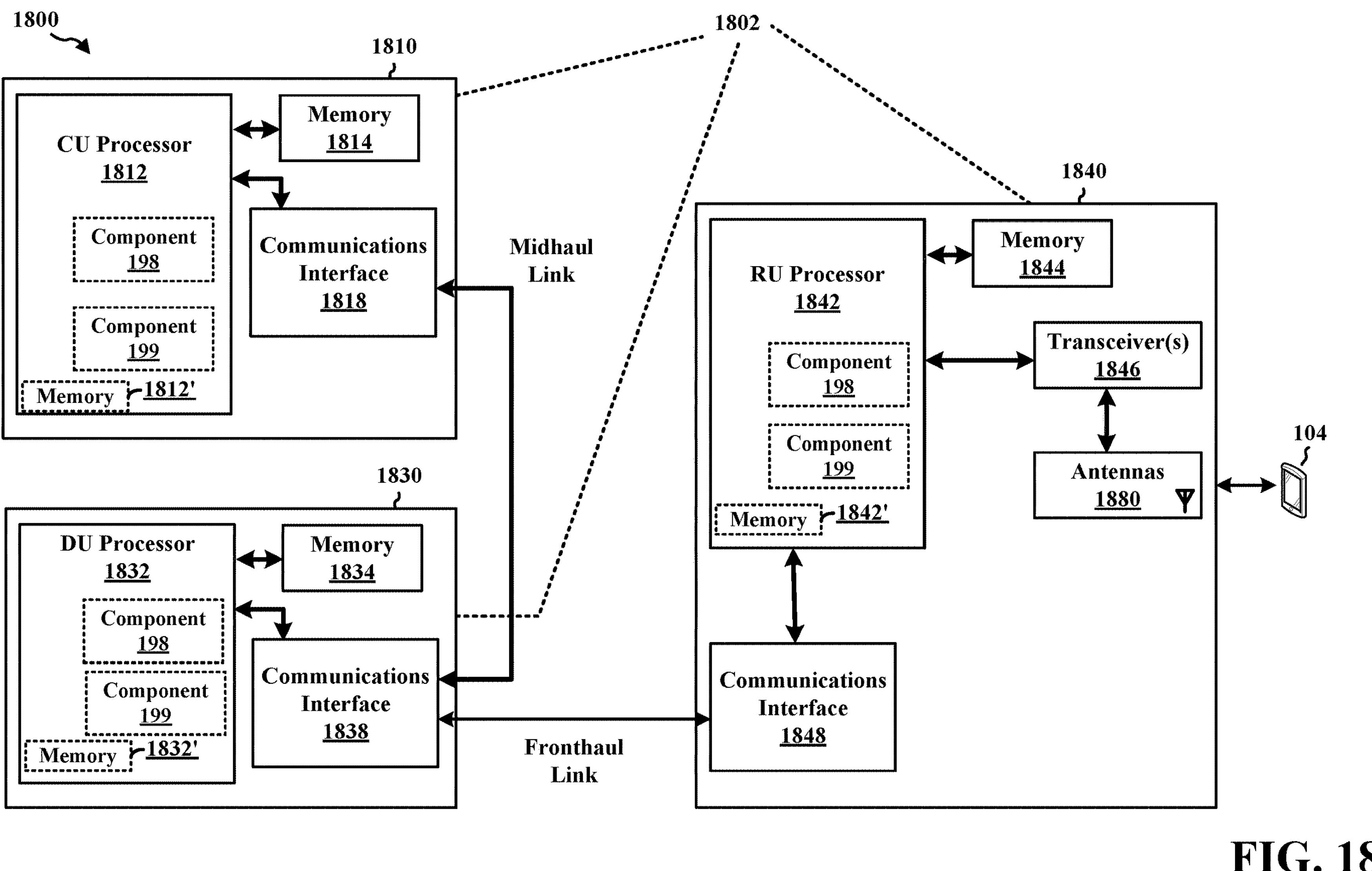
FIG. 18 is a diagram illustrating an example of a hardware implementation for an example network entity.

FIG. 18 is a diagram 1800 illustrating an example of a hardware implementation for a network entity 1802. The network entity 1802 may be a BS, a component of a BS, or may implement BS functionality. The network entity 1802 may include at least one of a CU 1810, a DU 1830, or an RU 1840. For example, depending on the layer functionality handled by the component 199, the network entity 1802 may include the CU 1810; both the CU 1810 and the DU 1830; each of the CU 1810, the DU 1830, and the RU 1840; the DU 1830; both the DU 1830 and the RU 1840; or the RU 1840. The CU 1810 may include at least one CU processor 1812. The CU processor(s) 1812 may include on-chip memory 1812'. In some aspects, the CU 1810 may further include additional memory modules 1814 and a communications interface 1818. The CU 1810 communicates with the DU 1830 through a midhaul link, such as an F1 interface. The DU 1830 may include at least one DU processor 1832. The DU processor(s) 1832 may include on-chip memory 1832'. In some aspects, the DU 1830 may further include additional memory modules 1834 and a communications interface 1838. The DU 1830 communicates with the RU 1840 through a fronthaul link. The RU 1840 may include at least one RU processor 1842. The RU processor(s) 1842 may include on-chip memory 1842'. In some aspects, the RU 1840 may further include additional memory modules 1844, one or more transceivers 1846, antennas 1880, and a communications interface 1848. The RU 1840 communicates with the UE 104. The on-chip memory 1812', 1832', 1842' and the additional memory modules 1814, 1834, 1844 may each be considered a computer-readable medium/memory. Each computer-readable medium/memory may be non-transitory. Each of the processors 1812, 1832, 1842 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 198 may be configured to receive, from a second sensing entity, a sensing information message that may include a first set of sensing attributes associated with a set of objects within an area associated with the first sensing entity. The component 198 may be configured to transmit a set of sensing signals at a target object. The component 198 may be configured to receive a set of reflected sensing signals based on the set of sensing signals and the target object. The component 198 may be configured to measure a second set of sensing attributes associated with the target object based on the set of reflected sensing signals and the first set of sensing attributes. The component 198 may be within one or more processors of one or more of the CU 1810, DU 1830, and the RU 1840. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1802 may include a variety of components configured for various functions. In one configuration, the network entity 1802 may include means for receiving, from a second sensing entity, a sensing information message that may include a first set of sensing attributes associated with a set of objects within an area associated with the first sensing entity. The network entity 1802 may include means for transmitting a set of sensing signals at a target object. The network entity 1802 may include means for receiving a set of reflected sensing signals based on the set of sensing signals and the target object. The network entity 1802 may include means for measuring a second set of sensing attributes associated with the target object based on the set of reflected sensing signals and the first set of sensing attributes. The first set of sensing attributes may include at least one of (a) a set of locations of a first subset of the set of objects within the area, (b) a set of dimensions associated with a second subset of the set of objects within the area, (c) a probability distribution of clutter information associated with the area, (d) a mean value of a clutter reflectivity associated with the area, (e) a median value of the clutter reflectivity associated with the area, (f) a set of sensing signal frequencies associated with the set of sensing signals, (g) a set of sensing signal beam angles associated with the set of sensing signals, (h) a set of ranges associated with the set of objects and a transmission reception point (TRP), (i) a set of angles associated with the set of objects and the TRP, or (j) a location of the TRP. The sensing information message may be a sensing background information message including a POS-SIB or a sensing-SIB. The network entity 1802 may include means for receiving, from the second sensing entity, a capability message that may include an indication that the second sensing entity is capable of a transmission of the first set of sensing attributes. The network entity 1802 may include means for transmitting, to the second sensing entity, a request message that may include a request for the first set of sensing attributes before the reception of the sensing information message from the second sensing entity. The capability message may include at least one of a set of candidate frequencies or a set of candidate angles. The request message may include a second indication of a selection of at least one of a subset of candidate frequencies from the set of candidate frequencies or a subset of candidate angles from the set of candidate angles. At least one of the subset of candidate frequencies or the subset of candidate angles may be associated with the set of sensing signals. The capability message may include a set of areas. The set of areas may include the area associated with the first sensing entity. The request message may include a second indication of a selection of the area associated with the first sensing entity from the set of areas. The capability message may include a set of sensing entities capable of providing the first set of sensing attributes. The request message may include a second indication of a selection of a subset of sensing entities from the set of sensing entities. The subset of sensing entities may include the second sensing entity. The capability message may include at least one of a beacon signal or an S-SSB. The network entity 1802 may include means for transmitting a second request message that may include a second request to initiate a positioning session. The reception of the capability message may be in response to the second request to initiate the positioning session. The sensing information message may include at least one of a sidelink communication message, a Wi-Fi message, or a UWB message. The second sensing entity may include one of a UE, a network node, a TRP, an SMF, or an RSU. The network entity 1802 may include means for outputting an indication of the measured second set of sensing attributes associated with the target object. The network entity 1802 may include means for outputting the indication of the measured second set of sensing attributes associated with the target object by transmitting the indication of the measured second set of sensing attributes associated with the target object. The network entity 1802 may include means for outputting the indication of the measured second set of sensing attributes associated with the target object by storing, in a memory or a cache, the indication of the measured second set of sensing attributes associated with the target object. The means may be the component 198 of the network entity 1802 configured to perform the functions recited by the means. As described supra, the network entity 1802 may include the TX processor 316, the RX processor 370, and the controller/processor 375. As such, in one configuration, the means may be the TX processor 316, the RX processor 370, and/or the controller/processor 375 configured to perform the functions recited by the means.

As discussed supra, the component 199 may be configured to transmit a set of sensing signals at a set of target objects. The component 199 may be configured to receive a set of reflected sensing signals based on the set of sensing signals and the set of target objects. The component 199 may be configured to measure a set of sensing attributes associated with the set of target objects based on the set of reflected sensing signals. The component 199 may be configured to transmit a sensing information message that may include a first subset of the set of sensing attributes associated with a second subset of the set of target objects within an area associated with a first sensing entity. The component 199 may be within one or more processors of one or more of the CU 1810, DU 1830, and the RU 1840. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1802 may include a variety of components configured for various functions. In one configuration, the network entity 1802 may include means for transmitting a set of sensing signals at a set of target objects. The network entity 1802 may include means for receiving a set of reflected sensing signals based on the set of sensing signals and the set of target objects. The network entity 1802 may include means for measuring a set of sensing attributes associated with the set of target objects based on the set of reflected sensing signals. The network entity 1802 may include means for transmitting a sensing information message that may include a first subset of the set of sensing attributes associated with a second subset of the set of target objects within an area associated with a first sensing entity. The first subset of the set of sensing attributes may include at least one of (a) a set of locations of a third subset of the set of objects within the area, (b) a set of dimensions associated with a fourth subset of the set of target objects within the area, (c) a probability distribution of clutter information associated with the area, (d) a mean value of a clutter reflectivity associated with the area, (e) a median value of the clutter reflectivity associated with the area, (f) a set of sensing signal frequencies associated with the set of sensing signals, (g) a set of sensing signal beam angles associated with the set of sensing signals, (h) a set of ranges associated with the set of objects and a transmission reception point (TRP), (i) a set of angles associated with the set of objects and the TRP, or (j) a location of the TRP. The network entity 1802 may include means for transmitting a capability message that may include an indication that the second sensing entity is capable of a transmission of the set of sensing attributes. The network entity 1802 may include means for receiving a request message that may include a request for the first subset of the set of sensing attributes in response to the transmission of the capability message. The capability message may include at least one of a set of candidate frequencies or a set of candidate angles. The request message may include a second indication of a selection of at least one of a third subset of candidate frequencies from the set of candidate frequencies or a fourth subset of candidate angles from the set of candidate angles. At least one of the third subset of candidate frequencies or the fourth subset of candidate angles may be associated with a subset of the set of sensing signals. The capability message may include a set of areas associated with the set of target objects. The request message may include a second indication of a selection of the area associated with the first sensing entity from the set of areas. The set of areas may include the area associated with the first sensing entity. The capability message may include a set of sensing entities capable of providing the set of sensing attributes. The request message may include a second indication of selection of a subset of sensing entities from the set of sensing entities. The subset of sensing entities may include the second sensing entity. The capability message may include at least one of a beacon signal or an S-SSB. The network entity 1802 may include means for receiving a second request message including a second request to initiate a positioning session. The transmission of the capability message may be in response to the second request to initiate the positioning session. The sensing information message may include at least one of a sidelink communication message, a Wi-Fi message, or a UWB message. The sensing information message may be a sensing background information message including a POS-SIB or a sensing-SIB. The means may be the component 199 of the network entity 1802 configured to perform the functions recited by the means. As described supra, the network entity 1802 may include the TX processor 316, the RX processor 370, and the controller/processor 375. As such, in one configuration, the means may be the TX processor 316, the RX processor 370, and/or the controller/processor 375 configured to perform the functions recited by the means.

Figure 19:
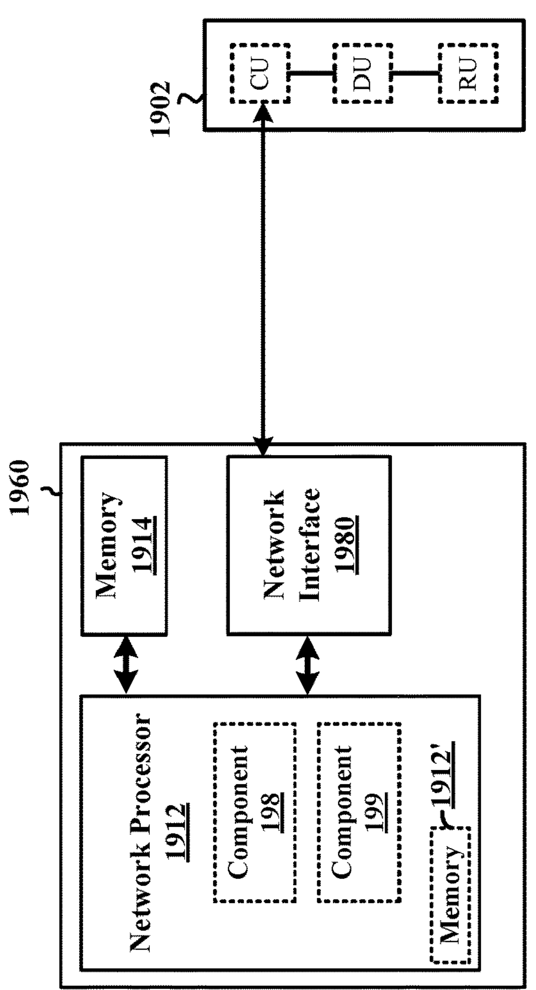
FIG. 19 is a diagram illustrating an example of a hardware implementation for an example network entity.

FIG. 19 is a diagram 1900 illustrating an example of a hardware implementation for a network entity 1960. In one example, the network entity 1960 may be within the core network 120. The network entity 1960 may include at least one network processor 1912. The network processor(s) 1912 may include on-chip memory 1912'. In some aspects, the network entity 1960 may further include additional memory modules 1914. The network entity 1960 communicates via the network interface 1980 directly (e.g., backhaul link) or indirectly (e.g., through a RIC) with the CU 1902. The on-chip memory 1912' and the additional memory modules 1914 may each be considered a computer-readable medium/memory. Each computer-readable medium/memory may be non-transitory. The network processor(s) 1912 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 198 may be configured to receive, from a second sensing entity, a sensing information message that may include a first set of sensing attributes associated with a set of objects within an area associated with the first sensing entity. The component 198 may be configured to transmit a set of sensing signals at a target object. The component 198 may be configured to receive a set of reflected sensing signals based on the set of sensing signals and the target object. The component 198 may be configured to measure a second set of sensing attributes associated with the target object based on the set of reflected sensing signals and the first set of sensing attributes. The component 198 may be within the network processor(s) 1912. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1960 may include a variety of components configured for various functions. In one configuration, the network entity 1960 may include means for receiving, from a second sensing entity, a sensing information message that may include a first set of sensing attributes associated with a set of objects within an area associated with the first sensing entity. The network entity 1960 may include means for transmitting a set of sensing signals at a target object. The network entity 1960 may include means for receiving a set of reflected sensing signals based on the set of sensing signals and the target object. The network entity 1960 may include means for measuring a second set of sensing attributes associated with the target object based on the set of reflected sensing signals and the first set of sensing attributes. The first set of sensing attributes may include at least one of (a) a set of locations of a first subset of the set of objects within the area, (b) a set of dimensions associated with a second subset of the set of objects within the area, (c) a probability distribution of clutter information associated with the area. (d) a mean value of a clutter reflectivity associated with the area, (e) a median value of the clutter reflectivity associated with the area, (f) a set of sensing signal frequencies associated with the set of sensing signals, (g) a set of sensing signal beam angles associated with the set of sensing signals, (h) a set of ranges associated with the set of objects and a transmission reception point (TRP), (i) a set of angles associated with the set of objects and the TRP, or (j) a location of the TRP. The sensing information message may be a sensing background information message including a POS-SIB or a sensing-SIB. The network entity 1960 may include means for receiving, from the second sensing entity, a capability message that may include an indication that the second sensing entity is capable of a transmission of the first set of sensing attributes. The network entity 1960 may include means for transmitting, to the second sensing entity, a request message that may include a request for the first set of sensing attributes before the reception of the sensing information message from the second sensing entity. The capability message may include at least one of a set of candidate frequencies or a set of candidate angles. The request message may include a second indication of a selection of at least one of a subset of candidate frequencies from the set of candidate frequencies or a subset of candidate angles from the set of candidate angles. At least one of the subset of candidate frequencies or the subset of candidate angles may be associated with the set of sensing signals. The capability message may include a set of areas. The set of areas may include the area associated with the first sensing entity. The request message may include a second indication of a selection of the area associated with the first sensing entity from the set of areas. The capability message may include a set of sensing entities capable of providing the first set of sensing attributes. The request message may include a second indication of a selection of a subset of sensing entities from the set of sensing entities. The subset of sensing entities may include the second sensing entity. The capability message may include at least one of a beacon signal or an S-SSB. The network entity 1960 may include means for transmitting a second request message that may include a second request to initiate a positioning session. The reception of the capability message may be in response to the second request to initiate the positioning session. The sensing information message may include at least one of a sidelink communication message, a Wi-Fi message, or a UWB message. The second sensing entity may include one of a UE, a network node, a TRP, an SMF, or an RSU. The network entity 1960 may include means for outputting an indication of the measured second set of sensing attributes associated with the target object. The network entity 1960 may include means for outputting the indication of the measured second set of sensing attributes associated with the target object by transmitting the indication of the measured second set of sensing attributes associated with the target object. The network entity 1960 may include means for outputting the indication of the measured second set of sensing attributes associated with the target object by storing, in a memory or a cache, the indication of the measured second set of sensing attributes associated with the target object. The means may be the component 198 of the network entity 1960 configured to perform the functions recited by the means.

As discussed supra, the component 199 may be configured to transmit a set of sensing signals at a set of target objects. The component 199 may be configured to receive a set of reflected sensing signals based on the set of sensing signals and the set of target objects. The component 199 may be configured to measure a set of sensing attributes associated with the set of target objects based on the set of reflected sensing signals. The component 199 may be configured to transmit a sensing information message that may include a first subset of the set of sensing attributes associated with a second subset of the set of target objects within an area associated with a first sensing entity. The component 199 may be within the network processor(s) 1912. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1960 may include a variety of components configured for various functions. In one configuration, the network entity 1960 may include means for transmitting a set of sensing signals at a set of target objects. The network entity 1960 may include means for receiving a set of reflected sensing signals based on the set of sensing signals and the set of target objects. The network entity 1960 may include means for measuring a set of sensing attributes associated with the set of target objects based on the set of reflected sensing signals. The network entity 1960 may include means for transmitting a sensing information message that may include a first subset of the set of sensing attributes associated with a second subset of the set of target objects within an area associated with a first sensing entity. The first subset of the set of sensing attributes may include at least one of (a) a set of locations of a third subset of the set of objects within the area. (b) a set of dimensions associated with a fourth subset of the set of target objects within the area, (c) a probability distribution of clutter information associated with the area, (d) a mean value of a clutter reflectivity associated with the area, (e) a median value of the clutter reflectivity associated with the area, (f) a set of sensing signal frequencies associated with the set of sensing signals, (g) a set of sensing signal beam angles associated with the set of sensing signals, (h) a set of ranges associated with the set of objects and a transmission reception point (TRP), (i) a set of angles associated with the set of objects and the TRP, or (j) a location of the TRP. The network entity 1960 may include means for transmitting a capability message that may include an indication that the second sensing entity is capable of a transmission of the set of sensing attributes. The network entity 1960 may include means for receiving a request message that may include a request for the first subset of the set of sensing attributes in response to the transmission of the capability message. The capability message may include at least one of a set of candidate frequencies or a set of candidate angles. The request message may include a second indication of a selection of at least one of a third subset of candidate frequencies from the set of candidate frequencies or a fourth subset of candidate angles from the set of candidate angles. At least one of the third subset of candidate frequencies or the fourth subset of candidate angles may be associated with a subset of the set of sensing signals. The capability message may include a set of areas associated with the set of target objects. The request message may include a second indication of a selection of the area associated with the first sensing entity from the set of areas. The set of areas may include the area associated with the first sensing entity. The capability message may include a set of sensing entities capable of providing the set of sensing attributes. The request message may include a second indication of selection of a subset of sensing entities from the set of sensing entities. The subset of sensing entities may include the second sensing entity. The capability message may include at least one of a beacon signal or an S-SSB. The network entity 1960 may include means for receiving a second request message including a second request to initiate a positioning session. The transmission of the capability message may be in response to the second request to initiate the positioning session. The sensing information message may include at least one of a sidelink communication message, a Wi-Fi message, or a UWB message. The sensing information message may be a sensing background information message including a POS-SIB or a sensing-SIB. The means may be the component 199 of the network entity 1960 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B. and C," and "A, B, C, or any combination thereof" may be A only, B only, C only, A and B. A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, may send the data to a device that transmits the data, or may output the data to a component of the device. A device configured to "obtain" data, such as a transmission, signal, or message, may receive, for example with a transceiver, may obtain the data from a device that receives the data, or may obtain the data from a component of the device. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means."

As such, no claim element is to be construed as a means plus function unless the element is expressly recited using the phrase "means for."

As used herein, the phrase "based on" may not be construed as a reference to a closed set of information, one or more conditions, one or more factors, or the like. In other words, the phrase "based on A" (where "A" may be information, a condition, a factor, or the like) may be construed as "based at least on A" unless specifically recited differently.

The following aspects are illustrative only and may be combined with other aspects or teachings described herein, without limitation.

Aspect 1 is a method of wireless communication at a first sensing entity, comprising receiving, from a second sensing entity, a sensing information message comprising a first set of sensing attributes associated with a set of objects within an area associated with the first sensing entity. The method further comprises receiving a set of reflected sensing signals comprising a set of sensing signals reflected off of a target object. The method further comprises measuring a second set of sensing attributes associated with the target object based on the set of reflected sensing signals and the first set of sensing attributes.

Aspect 2 is the method of aspect 1, wherein the first set of sensing attributes comprises at least one of (a) a set of locations of a first subset of the set of objects within the area, (b) a set of dimensions associated with a second subset of the set of objects within the area, (c) a probability distribution of clutter information associated with the area, (d) a mean value of a clutter reflectivity associated with the area, (e) a median value of the clutter reflectivity associated with the area, (f) a set of sensing signal frequencies associated with the set of sensing signals, (g) a set of sensing signal beam angles associated with the set of sensing signals, (h) a set of ranges associated with the set of objects and a transmission reception point (TRP), (i) a set of angles associated with the set of objects and the TRP, or (j) a location of the TRP.

Aspect 3 is the method of any of aspects 1 and 2, wherein the sensing information message is a sensing background information message comprising a positioning system information block (POS-SIB) or a sensing system information block (sensing-SIB).

Aspect 4 is the method of any of aspects 1 to 3, wherein the method further comprises receiving, from the second sensing entity, a capability message comprising an indication that the second sensing entity is capable of a transmission of the first set of sensing attributes. The method further comprises transmitting, to the second sensing entity, a request message comprising a request for the first set of sensing attributes before the reception of the sensing information message from the second sensing entity.

Aspect 5 is the method of aspect 4, wherein the capability message comprises at least one of a set of candidate frequencies or a set of candidate angles, wherein the request message comprises a second indication of a selection of at least one of a subset of candidate frequencies from the set of candidate frequencies or a subset of candidate angles from the set of candidate angles, wherein at least one of the subset of candidate frequencies or the subset of candidate angles is associated with the set of sensing signals.

Aspect 6 is the method of either of aspects 4 or 5, wherein the capability message comprises a set of areas, wherein the set of areas includes the area associated with the first sensing entity, wherein the request message comprises a second indication of a selection of the area associated with the first sensing entity from the set of areas.

Aspect 7 is the method of any of aspects 4 to 6, wherein the capability message comprises a set of sensing entities capable of providing the first set of sensing attributes, wherein the request message comprises a second indication of a selection of a subset of sensing entities from the set of sensing entities, wherein the subset of sensing entities comprises the second sensing entity.

Aspect 8 is the method of any of aspects 4 to 7, wherein the capability message comprises at least one of a beacon signal or a sidelink synchronization signal block (S-SSB).

Aspect 9 is the method of any of aspects 4 to 8, wherein the method further comprises transmitting a second request message comprising a second request to initiate a positioning session, wherein the reception of the capability message is in response to the second request to initiate the positioning session.

Aspect 10 is the method of any of aspects 1 to 9, wherein the sensing information message comprises at least one of a sidelink communication message, a Wi-Fi message, or an ultra-wideband (UWB) message.

Aspect 11 is the method of any of aspects 1 to 10, wherein the second sensing entity comprises one of a user equipment (UE), a network node, a transmission reception point (TRP), a sensing management function (SMF), or a roadside unit (RSU).

Aspect 12 is the method of any of aspects 1 to 11, wherein the method further comprises outputting an indication of the measured second set of sensing attributes associated with the target object.

Aspect 13 is the method of any of aspects 1 to 12, wherein outputting the indication of the measured second set of sensing attributes associated with the target object comprises transmitting the indication of the measured second set of sensing attributes associated with the target object or outputting the indication of the measured second set of sensing attributes associated with the target object comprises storing, in a memory or a cache, the indication of the measured second set of sensing attributes associated with the target object.

Aspect 14 is a method of wireless communication at a second sensing entity, comprising transmitting a set of sensing signals at a set of target objects. The method further comprises receiving a set of reflected sensing signals based on the set of sensing signals and the set of target objects. The method further comprises measuring a set of sensing attributes associated with the set of target objects based on the set of reflected sensing signals. The method further comprises transmitting a sensing information message comprising a first subset of the set of sensing attributes associated with a second subset of the set of target objects within an area associated with a first sensing entity.

Aspect 15 is the method of aspect 14, wherein the first subset of the set of sensing attributes comprises at least one of (a) a set of locations of a third subset of the set of objects within the area. (b) a set of dimensions associated with a fourth subset of the set of target objects within the area. (c) a probability distribution of clutter information associated with the area, (d) a mean value of a clutter reflectivity associated with the area, (e) a median value of the clutter reflectivity associated with the area, (f) a set of sensing signal frequencies associated with the set of sensing signals, (g) a set of sensing signal beam angles associated with the set of sensing signals, (h) a set of ranges associated with the set of objects and a transmission reception point (TRP), (i) a set of angles associated with the set of objects and the TRP, or (j) a location of the TRP.

Aspect 16 is the method of either of aspects 14 or 15, wherein the method further comprises transmitting a capability message comprising an indication that the second sensing entity is capable of a transmission of the set of sensing attributes. The method further comprises receiving a request message comprising a request for the first subset of the set of sensing attributes in response to the transmission of the capability message.

Aspect 17 is the method of aspect 16, wherein the capability message comprises at least one of a set of candidate frequencies or a set of candidate angles, wherein the request message comprises a second indication of a selection of at least one of a third subset of candidate frequencies from the set of candidate frequencies or a fourth subset of candidate angles from the set of candidate angles, wherein at least one of the third subset of candidate frequencies or the fourth subset of candidate angles is associated with a subset of the set of sensing signals.

Aspect 18 is the method of either of aspects 16 or 17, wherein the capability message comprises a set of areas associated with the set of target objects, wherein the request message comprises a second indication of a selection of the area associated with the first sensing entity from the set of areas, wherein the set of areas includes the area associated with the first sensing entity.

Aspect 19 is the method of any of aspects 16 to 18, wherein the capability message comprises a set of sensing entities capable of providing the set of sensing attributes, wherein the request message comprises a second indication of selection of a subset of sensing entities from the set of sensing entities, wherein the subset of sensing entities comprises the second sensing entity.

Aspect 20 is the method of any of aspects 16 to 19, wherein the capability message comprises at least one of a beacon signal or a sidelink synchronization signal block (S-SSB).

Aspect 21 is the method of any of aspects 16 to 20, wherein the method further comprises receiving a second request message comprising a second request to initiate a positioning session, wherein the transmission of the capability message is in response to the second request to initiate the positioning session.

Aspect 22 is the method of any of aspects 14 to 23, wherein the sensing information message comprises at least one of a sidelink communication message, a Wi-Fi message, or an ultra-wideband (UWB) message.

Aspect 23 is the method of any of aspects 14 to 23, wherein the sensing information message is a sensing background information message comprising a positioning system information block (POS-SIB) or a sensing system information block (sensing-SIB).

Aspect 24 is the method of any of aspects 14 to 23, wherein the second sensing entity comprises one of a user equipment (UE), a network node, a transmission reception point (TRP), a sensing management function (SMF), or a roadside unit (RSU).

Aspect 25 is the method of any of aspects 1 to 13, wherein the method further comprises transmitting the set of sensing signals at the target object.

Aspect 26 is the method of any of aspects 1 to 13, wherein the method further comprises receiving a configuration message comprising a configuration for the set of sensing signals. Receiving the set of reflected sensing signals comprises receiving the set of reflected sensing signals based on the configuration.

Aspect 27 is an apparatus for wireless communication, including: at least one memory; and at least one processor coupled to the at least one memory and, based at least in part on information stored in the at least one memory, the at least one processor, individually or in any combination, is configured to implement any of aspects 1 to 26.

Aspect 28 is the apparatus of aspect 27, further including at least one of an antenna or a transceiver coupled to the at least one processor.

Aspect 29 is an apparatus for wireless communication including means for implementing any of aspects 1 to 26.

Aspect 30 is a computer-readable medium (e.g., a non-transitory computer-readable medium) storing computer executable code, where the code when executed by a processor causes the processor to implement any of aspects 1 to 26.

What is claimed is:

1. An apparatus for wireless communication at a first sensing entity, comprising:

at least one memory; and at least one processor coupled to the at least one memory and, based at least in part on information stored in the at least one memory, the at least one processor is configured to:

receive, from a second sensing entity, a sensing information message comprising a set of sensing environment information associated with a set of objects within an area associated with the first sensing entity;

receive a set of reflected sensing signals comprising a set of sensing signals reflected off of a target object; and measure a set of sensing attributes associated with the target object based on the set of reflected sensing signals and the set of sensing environment information associated with the set of objects.

2. The apparatus of claim 1, wherein the set of sensing environment information comprises at least one of:

a set of locations of a first subset of the set of objects within the area;

a set of dimensions associated with a second subset of the set of objects within the area;

a probability distribution of clutter information associated with the area;

a mean value of a clutter reflectivity associated with the area;

a median value of the clutter reflectivity associated with the area;

a set of sensing signal frequencies associated with the set of sensing signals;

a set of sensing signal beam angles associated with the set of sensing signals;

a set of ranges associated with the set of objects and a transmission reception point (TRP);

a set of angles associated with the set of objects and the TRP;

a location of the TRP; or any combination thereof.

3. The apparatus of claim 1, wherein the sensing information message comprises a sensing background information message comprising a positioning system information block (POS-SIB) or a sensing system information block (sensing-SIB).

4. The apparatus of claim 1, wherein the at least one processor is configured to:

receive, from the second sensing entity, a capability message comprising an indication that the second sensing entity is capable of a transmission of the set of sensing environment information; and transmit, to the second sensing entity, a request message comprising a request for the set of sensing environment information before the reception of the sensing information message from the second sensing entity.

5. The apparatus of claim 4, wherein the capability message comprises at least one of a set of candidate frequencies or a set of candidate angles, wherein the request message comprises a second indication of a selection of at least one of a subset of candidate frequencies from the set of candidate frequencies or a subset of candidate angles from the set of candidate angles, wherein at least one of the subset of candidate frequencies or the subset of candidate angles is associated with the set of sensing signals.

6. The apparatus of claim 4, wherein the capability message comprises a set of areas, wherein the set of areas includes the area associated with the first sensing entity, wherein the request message comprises a second indication of a selection of the area associated with the first sensing entity from the set of areas.

7. The apparatus of claim 4, wherein the capability message comprises a set of sensing entities capable of providing the set of sensing environment information, wherein the request message comprises a second indication of a selection of a subset of sensing entities from the set of sensing entities, wherein the subset of sensing entities comprises the second sensing entity.

8. The apparatus of claim 4, wherein the capability message comprises at least one of a beacon signal or a sidelink synchronization signal block (S-SSB).

9. The apparatus of claim 4, wherein the at least one processor is configured to:

transmit a second request message comprising a second request to initiate a positioning session, wherein the reception of the capability message is in response to the second request to initiate the positioning session.

10. The apparatus of claim 1, wherein the sensing information message comprises at least one of a sidelink communication message, a Wi-Fi message, or an ultra-wideband (UWB) message.

11. The apparatus of claim 1, wherein the second sensing entity comprises one of a user equipment (UE), a network node, a transmission reception point (TRP), a sensing management function (SMF), or a roadside unit (RSU).

12. The apparatus of claim 1, wherein the at least one processor is configured to:

output an indication of the measured set of sensing attributes associated with the target object.

13. The apparatus of claim 12, wherein, to output the indication of the measured set of sensing attributes associated with the target object, the at least one processor is configured to:

transmit the indication of the measured set of sensing attributes associated with the target object; or store, in a memory or a cache, the indication of the measured set of sensing attributes associated with the target object.

14. The apparatus of claim 1, further comprising a transceiver coupled to the at least one processor, wherein the at least one processor is configured to:

receive, via the transceiver, the sensing information message;

transmit, via the transceiver, the set of sensing signals; and receive, via the transceiver, the set of reflected sensing signals.

15. The apparatus of claim 1, wherein the at least one processor is further configured to:

transmit the set of sensing signals at the target object.

16. The apparatus of claim 1, wherein the at least one processor is further configured to:

receive a configuration message comprising a configuration for the set of sensing signals, wherein, to receive the set of reflected sensing signals, the at least one processor is configured to:

receive the set of reflected sensing signals based on the configuration.

17. A method of wireless communication at a first sensing entity, comprising:

receiving, from a second sensing entity, a sensing information message comprising a set of sensing environment information associated with a set of objects within an area associated with the first sensing entity;

transmitting a set of sensing signals at a target object;

receiving a set reflected sensing signals based on the set of sensing signals and the target object; and measuring a second set of sensing attributes associated with the target object based on the set of reflected sensing signals and the set of sensing environment information associated with the set of objects.

18. The method of claim 17, wherein the set of sensing environment information comprises at least one of:

a set of locations of a first subset of the set of objects within the area;

a set of dimensions associated with a second subset of the set of objects within the area;

a probability distribution of clutter information associated with the area;

a mean value of a clutter reflectivity associated with the area;

a median value of the clutter reflectivity associated with the area;

a set of sensing signal frequencies associated with the set of sensing signals;

a set of sensing signal beam angles associated with the set of sensing signals;

a set of ranges associated with the set of objects and a transmission reception point (TRP);

a set of angles associated with the set of objects and the TRP;

a location of the TRP; or any combination thereof.

19. The method of claim 17, wherein the sensing information message comprises a sensing background information message comprising a positioning system information block (POS-SIB) or a sensing system information block (sensing-SIB).

20. The method of claim 17, further comprising:

receiving, from the second sensing entity, a capability message comprising an indication that the second sensing entity is capable of a transmission of the set of sensing environment information; and transmit, to the second sensing entity, a request message comprising a request for the set of sensing environment information before the reception of the sensing information message from the second sensing entity.

21. The method of claim 20, wherein the capability message comprises at least one of a set of candidate frequencies or a set of candidate angles, wherein the request message comprises a second indication of a selection of at least one of a subset of candidate frequencies from the set of candidate frequencies or a subset of candidate angles from the set of candidate angles, wherein at least one of the subset of candidate frequencies or the subset of candidate angles is associated with the set of sensing signals.

22. The method of claim 20, wherein the capability message comprises a set of areas, wherein the set of areas includes the area associated with the first sensing entity, wherein the request message comprises a second indication of a selection of the area associated with the first sensing entity from the set of areas.

23. The method of claim 20, wherein the capability message comprises a set of sensing entities capable of providing the set of sensing environment information, wherein the request message comprises a second indication of a selection of a subset of sensing entities from the set of sensing entities, wherein the subset of sensing entities comprises the second sensing entity.

24. The method of claim 20, wherein the capability message comprises at least one of a beacon signal or a sidelink synchronization signal block (S-SSB).

25. The method of claim 20, further comprising:

transmitting a second request message comprising a second request to initiate a positioning session, wherein the reception of the capability message is in response to the second request to initiate the positioning session.

26. The method of claim 17, wherein the second sensing entity comprises one of a user equipment (UE), a network node, a transmission reception point (TRP), a sensing management function (SMF), or a roadside unit (RSU).

27. The method of claim 17, further comprising:

outputting an indication of the measured set of sensing attributes associated with the target object.

28. The method of claim 27, wherein outputting the indication of the measured set of sensing attributes associated with the target object comprises:

transmitting the indication of the measured set of sensing attributes associated with the target object; or storing, in a memory or a cache, the indication of the measured set of sensing attributes associated with the target object.

29. The method of claim 17, further comprising:

transmitting the set of sensing signals at the target object.

30. The method of claim 17, further comprising:

receiving a configuration message comprising a configuration for the set of sensing signals, wherein receiving the set of reflected sensing signals comprises:

receiving the set of reflected sensing signals based on the configuration.

31. A non-transitory computer-readable medium storing computer executable code at a first sensing entity, the code when executed by at least one processor causes the at least one processor to:

receive, from a second sensing entity, a sensing information message comprising a set of sensing environment information associated with a set of objects within an area associated with the first sensing entity;

receive a set of reflected sensing signals comprising a set of sensing signals reflected off of a target object; and measure a set of sensing attributes associated with the target object based on the set of reflected sensing signals and the set of sensing environment information associated with the set of objects.

* * * * *